(12) United States Patent
Kato et al.

(10) Patent No.: US 8,422,759 B2
(45) Date of Patent: Apr. 16, 2013

(54) IMAGE PROCESSING METHOD AND IMAGE PROCESSING DEVICE

(75) Inventors: Yutaka Kato, Uji (JP); Shiro Fujieda, Otokuni-gun (JP); Yutaka Kiuchi, Souraku-gun (JP); Shohei Nakaoka, Ayabe (JP)

(73) Assignee: OMRON Corporation, Kyoto-shi (JP)

( * ) Notice: Subject to any disclaimer, the term of this patent is extended or adjusted under 35 U.S.C. 154(b) by 276 days.

(21) Appl. No.: 13/029,451

(22) Filed: Feb. 17, 2011

(65) Prior Publication Data

US 2011/0222766 A1    Sep. 15, 2011

(30) Foreign Application Priority Data

Mar. 12, 2010 (JP) ................................. 2010-056419

(51) Int. Cl.
 *G06T 7/001* (2006.01)
(52) U.S. Cl.
 USPC ........... 382/141; 382/168; 382/149; 382/209; 382/294; 345/175; 345/87; 345/104; 345/125; 345/173
(58) Field of Classification Search .......... 382/100–154, 382/168–172, 176–308; 345/175, 87, 104, 345/125, 173
 See application file for complete search history.

(56) References Cited

U.S. PATENT DOCUMENTS

| 6,954,550 B2 * | 10/2005 | Fujieda .......................... 382/199 |
| 7,016,539 B1 | 3/2006 | Silver et al. |
| 2008/0219545 A1 * | 9/2008 | Chen et al. ..................... 382/145 |

FOREIGN PATENT DOCUMENTS

| JP | 09-054828 A | 2/1997 |
| JP | 2002-230549 A | 8/2002 |
| JP | 2002-230562 A | 8/2002 |

\* cited by examiner

*Primary Examiner* — Kathleen Y Dulaney
*Assistant Examiner* — Ruiping Li
(74) *Attorney, Agent, or Firm* — Marvin A. Motsenbocker; Mots Law, PLLC

(57) ABSTRACT

An edge code histogram of a model generated in a model image is registered. A target region with respect to the input image is set. An edge code histogram for the target region is generated. A relative positional relationship between the edge code histogram of the model and the edge code histogram for the target region is sequentially changed, and a degree of coincidence between the edge code histograms at each relative position is calculated. A possibility that the region that matches the model is contained in the set target region from the sequentially calculated degree of coincidence between the edge code histograms is evaluated. Then a candidate point having a possibility of matching the model in the input image is specified while sequentially changing the position of the target region with respect to the input image and repeating steps above for each target region.

10 Claims, 26 Drawing Sheets

(x1, y1, Ec1)
(x2, y2, Ec2)
⋮
(xn, yn, Ecn)

GENERATION OF EDGE CODE HISTOGRAM
IN BLOCK UNITS

IMAGE PROCESSING METHOD AND IMAGE PROCESSING DEVICE

CROSS REFERENCE TO RELATED APPLICATIONS

This application claims priority based on 35 USC 119 from prior Japanese Patent Application No. 2010-056419 filed on Mar. 12, 2010, entitled. "IMAGE PROCESSING METHOD AND IMAGE PROCESSING DEVICE", the entire contents of which are incorporated herein by reference.

BACKGROUND OF THE INVENTION

1. Technical Field

The present invention relates to an image processing method and an image processing device for searching a region that matches a model registered in advance from an input image.

2. Related Art

In the field of FA (Factory Automation) and the like, a search process (hereinafter also referred so as "pattern matching process") based on the pattern (hereinafter also referred to as "model") registered in advance is used on an input image in which a measuring object (also referred to as "work") is imaged. Defects such as scratches and dusts that appear on the work can be detected, and a region on the work similar to the model can be found through such pattern matching process.

As one method of the pattern matching process, it is known to extract a portion (hereinafter also referred to as "edge (portion)") where the gray value (brightness) changes in the input image and to perform the pattern matching based on a value (hereinafter also referred to as "edge code" or "EC (Edge Code)") indicating the changing direction of the edge (gradient direction of the pixel concentration). See for example, Japanese Unexamined Patent Publication No. 9-54828 (patent document 1), Japanese Unexamined Patent Publication No. 2002-230549 (patent document 2), Japanese Unexamined Patent Publication No. 2002-230562 (patent document 3), and the like.

A region that matches/is similar to the model can be accurately found even if an influence (e.g., appearing of shade and illumination unevenness) at the time of imaging of the in image exists by using the edge code.

U.S. Pat. No. 7,016,539 (patent document 4) discloses a method of searching for a plurality of patterns existing in an image using a model described by the information referred to as probes that represent the relative positional relationship of each characteristic point in the pattern.

SUMMARY

However, the position and the orientation of each of the plurality of patterns can be obtained in the method disclosed in U.S. Pat. No. 7,016,539, but the model rotation process and the pattern matching process need to be repeated over the entire range of the image, and thus the processing takes time. The invention has been devised to alleviate the problems described above. An object thereof is to provide an image processing device and an image processing program capable of high speed searching for a plurality of patterns in the image.

In accordance with one aspect, an image processing method for searching a region that matches a model registered in advance from an input image is provided. The image processing method includes the steps of; a registering step for storing an edge code histogram of a model generated from a plurality of edge codes contained in a model image representing a model; a setting step for setting a first region of interest with respect to the input image; a generating step for generating an edge code histogram, for the first region of interest; a calculating step for sequentially changing a relative positional relationship between the edge code histogram of the model and the edge code histogram for the first region of interest and sequentially calculating a degree of coincidence between the edge code histograms at each relative position; an evaluating step for evaluating the possibility the region that matches the model is contained in the set first region of interest from the sequentially calculated degree of coincidence between the edge code histograms; and a first specifying step for sequentially changing the position of the first region of interest with respect to the input image and repeating the generating step, the calculating step, and the evaluating step for each first region of interest to specify a candidate point having the possibility of matching the model in the input image.

The first specifying step preferably includes temporarily determining the candidate point in units of a first interval, by sequentially arranging the first region of interest at the first interval with respect to the input image, and determining the candidate point in units of a second interval by sequentially arranging the first region of interest at the second interval shorter than the first interval at a plurality of nearby positions including the temporarily determined candidate point with respect to the input image.

The first specifying step more preferably includes a step of determining a rotation angle corresponding to the relative positional relationship of the edge code histogram of the model and the edge code histogram for the first region of interest at which the degree of coincidence between the edge code histograms has a local maximum value at the determined candidate point as a candidate angle corresponding to the candidate point.

The registering step more preferably includes a step of storing an edge code image showing the model; and the image processing method further includes the steps of a setting step for setting a second region of interest at a plurality of nearby positions including the candidate point with respect to the input image; and a second specifying step for specifying a region that matches the model in the input image by calculating the degree of coincidence between each edge code image obtained when the edge code image showing the model is rotated to the plurality of nearby angles including the candidate angle corresponding to the candidate point and each edge code image for the second region of interest arranged at each of the plurality of positions.

The image processing method more preferably further includes the step of calculating a rotation angle with respect to the model of an object existing in the region that matches the model specified in the second specifying step using change in the degree of coincidence between the edge code histograms obtained when the relative positional relationship between the edge code histogram of the model and the edge code histogram for the region that matches the model specified in the second specifying step is changed in plural ways.

The image processing method more preferably further includes a step of removing one of the regions proximate to each other of the regions that match the model specified in the second specifying step.

The degree of coincidence between the edge code histograms is preferably calculated from a cumulative value of frequency in a difference histogram of the two target edge code histograms.

The generating step preferably includes dividing the input image into blocks of a block size defined in advance and generating an edge code histogram for each block, the first region of interest being set to integral multiples of the block size; and adding the edge code histogram for one or a plurality of blocks existing in the set first region of interest for every setting of the first region of interest with respect to the input image to generate the edge code histogram for the first region of interest.

The registering step preferably includes the steps of receiving a specification of a region to become the model with respect to the model image; shaping the specified region to become the model to a square; and generating the edge code histogram of the model from the edge code contained in a circular range inscribing the shaped region.

In accordance with another aspect of the invention, an image processing device is provided for receiving an input image and searching a region that matches a model registered in advance. The image processing device includes a storage unit for storing an edge code histogram of a model generated from a plurality of edge codes contained in a model image representing a model; and a specifying unit for specifying a candidate point having the possibility of matching the model in the input image by sequentially setting a first region of interest with respect to the input image. The specifying unit generates an edge code histogram for each set first region of interest, sequentially changes a relative positional relationship between the edge code histogram of the model and the edge code histogram for the first region of interest, and sequentially calculates a degree of coincidence between the edge code histograms at each relative position, and evaluates the possibility the region that matches the model is contained in the set first region of interest from the sequentially calculated degree of coincidence between the edge code histograms.

According to the method above, the region that matches the model registered in advance can be more accurately searched.

BRIEF DESCRIPTION OF THE DRAWINGS

FIG. 21 is a view showing one example of a user interface screen provided in the setting mode by the image processing device according to an embodiment;

DETAILED DESCRIPTION

Figure 1:
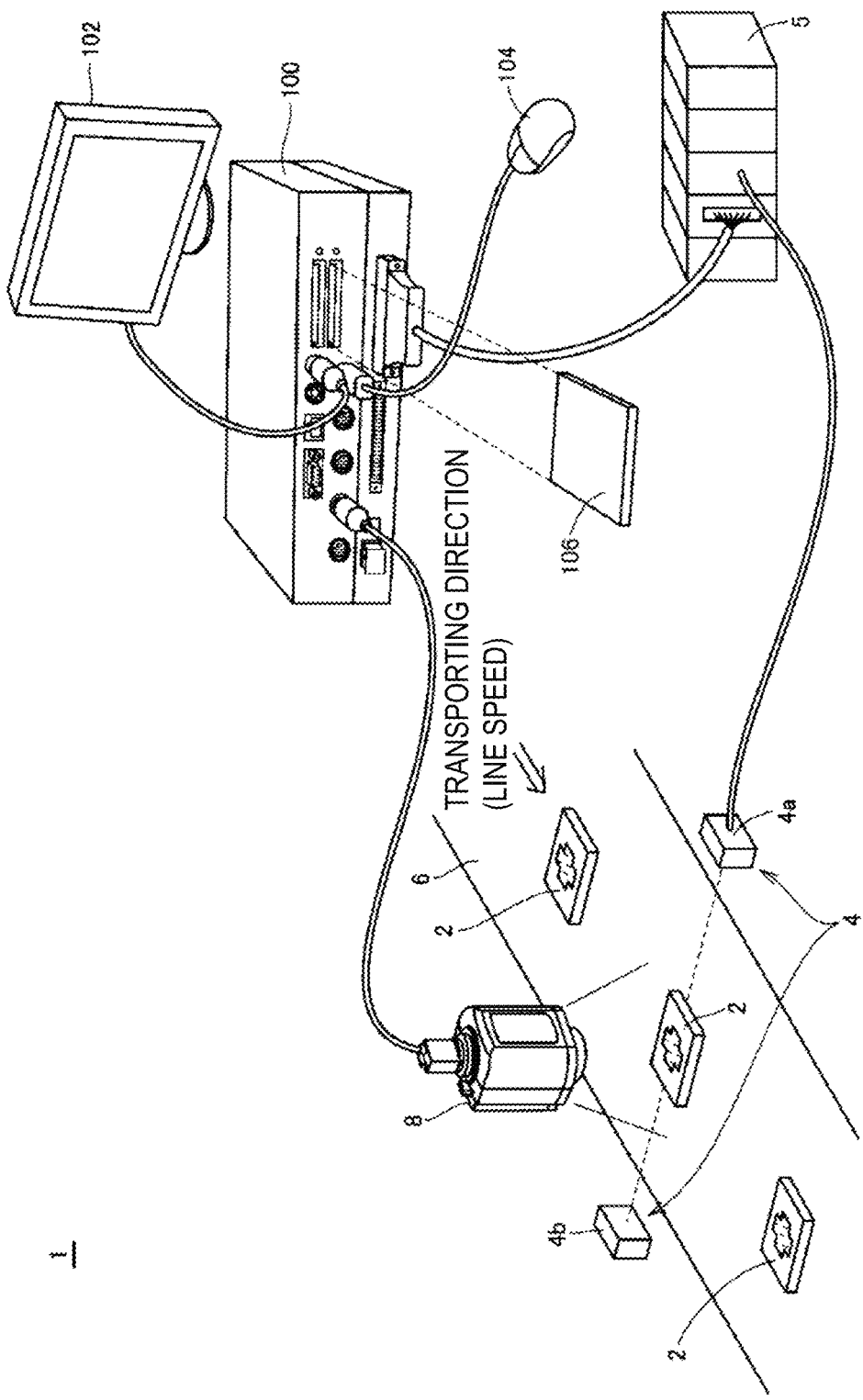
FIG. 1 is a schematic view showing the overall configuration of a visual sensor system including an image processing device according to an embodiment.

Hereinafter, embodiments of the invention is described in detail with reference to the drawings. The same reference numerals are denoted on the same or corresponding portions in the figure, and the description thereof will not be repeated.

<<A. Outline>>

The image processing method according to an embodiment is directed to the pattern matching process of searching for a region that matches a model registered in advance from an input image. In the image processing method, an edge code image indicating the model and an edge code histogram indicating the model are registered in advance. The details of the edge code image and the edge code histogram are described later. A region (candidate point) having the possibility of matching the model is then searched (hereinafter also referred to as "rough search") using the edge code histogram with respect to the target input image. Thereafter, the region that matches the model is searched (hereinafter also referred to as "detailed search") centering on the candidate point using the edge code image.

Higher speed and higher accuracy of the pattern matching process are realized by combining the rough search using the edge code histogram and the detailed search using the edge code image.

<<B. Overall Device Configuration>>

FIG. 1 is a schematic view showing the overall configuration of a visual sensor system including an image processing device 100 according to an embodiment.

With reference to FIG. 1, the visual sensor system 1 is incorporated in a production line, and the like, and the pattern matching process is executed on a work 2 using the model registered in advance ("edge node image" is used as hereinafter described).

In the visual sensor system 1, the work 2 is transported by a transport mechanism 6 such as a conveyor belt, and the transported work 2 is imaged by an imaging device 8 at a predetermined timing. By way of example, the imaging device 8 is configured to include an imaging element partitioned no a plurality of pixels such as a CCD (Coupled Charged Device) and a CMOS (Complementary Metal Oxide Semiconductor) sensor in addition to an optical system such as a lens. An illumination mechanism for irradiating the work 2 to be imaged with the imaging device 8 with light may be further arranged.

An image (hereinafter also referred to as "input image") obtained by the imaging device 8 is transmitted to the image processing device 100. The image processing device 100 executes the pattern matching process on the input image received from the imaging device 8, and displays the result thereof on the connected display 102 or outputs the result to the external device.

When the work 2 reaches the field of the imaging device 8, it is detected by photoelectric sensors 4 arranged at each end of the transport mechanism 6. Specifically, the photoelectric sensor 4 includes a light receiving unit 4a and a light projecting unit 4b arranged on the same optical axis, and the arrival of the work 2 is detected when the light receiving unit 4a detects that the light radiated from the light projecting unit 4b is shielded by the work 2. A trigger signal of the photoelectric sensor 4 is output to a PLC (Programmable Logic Controller) 5.

The PLC 5 receives a trigger signal from the photoelectric sensor 4, and the like, and is responsible for the control of the transport mechanism 6.

The image processing device 100 has a measurement mode for executing various types of image processing on the work 2, and a setting mode for performing the model registration process and the like, to be described later. Such modes are switched when the user operates a mouse 104, and the like.

The image processing device 100 is typically a computer having a versatile architecture, and provides various types of functions, to be described later, by executing a program (command code) installed in advance. Such program is typically circulated in a state stored in a memory card 106 and the like.

When using such versatile computer, an OS (Operating System) for providing the basic functions of the computer may be installed in addition to the application for providing the functions according to the embodiment. In such a case, the program according to the embodiment may be a program module that calls out the necessary module of the program modules provided as part of the OS in a predetermined array at a predetermined timing and executes the process. In other words, the program itself according to the embodiment may not include such module, and the process may be executed in cooperation with the OS. The program according to the embodiment may not include such module.

The program according to the embodiment may be incorporated in one part of another program to be provided. In this case as well, the program itself does not include the module included in another program to be combined, and the process is executed in cooperation with the other program. In other words, the program according to the embodiment may be incorporated in another program. One part of or all of the functions provided by executing the program may be installed as a dedicated hardware circuit.

Figure 2:
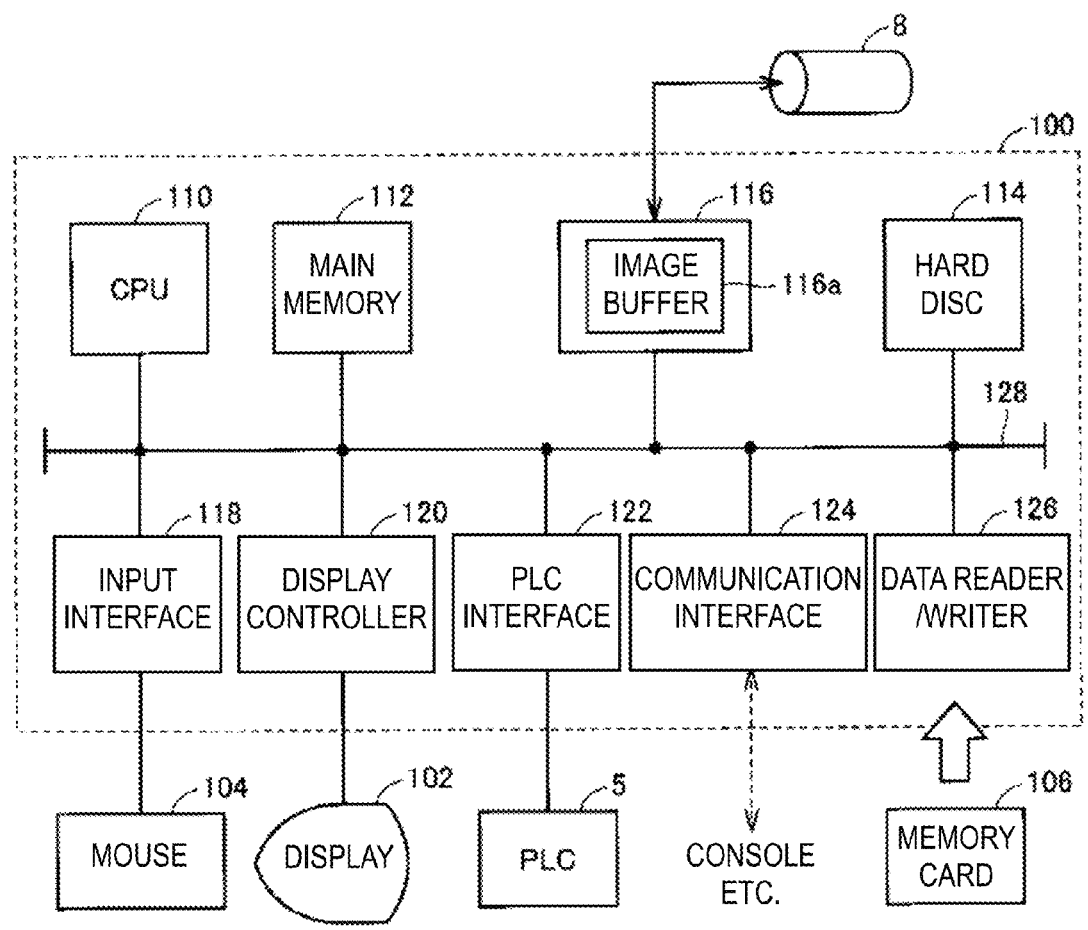
FIG. 2 is a schematic configuration diagram of the image processing device according to the embodiment.

FIG. 2 is a schematic configuration diagram of the image processing device 100 according to the embodiment. With reference to FIG. 2, the image processing device 100 includes a CPU (Central Processing Unit) 110 or an arithmetic processing unit, a main memory 112 and a hard disc 114 serving as storage units, a camera interface 116, an input interface 118, a display controller 120, a PLC interface 122, a communication interface 124, and a data reader/writer 126. Each of such units is communicably connected to each other through a bus 128.

The CPU 110 transfers the program (code) stored in the hard disc 114 to the main memory 112 and executes the same in a predetermined order to perform various calculations. The main memory 112 is typically a volatile storage device such as a DRAM (Dynamic Random Access Memory), and holds information such as image data acquired by the imaging device 8, work data, and the model in addition to the program read from the hard disc 114. Furthermore, the hard disc 114 may store various set values and the like. In addition to the hard disc 114 or in place of the hard disc 114, a semiconductor storage device such as a flash memory may be used.

The camera interface 116 handles the data transmission between the CPU 110 and the imaging device 8. In other words, the camera interface 116 is connected to the imaging device 8 for imaging the work 2 and generating the image data. More specifically, the camera interface 116 can be connected to one or more imaging devices 8, and includes an image buffer 116a for temporarily storing the image data from the imaging device 8. When the image data of a predetermined number of frames is stored in the image buffer 116a, the camera interface 116 provides an imaging command to the imaging device 8 according to an internal command generated by the CPU 110.

The input interface 118 handles the data transmission between the CPU 110 and the input unit such as the mouse 104, the keyboard, or the touch panel. In other words, the input interface 118 receives an operation command provided when the user operates the input unit.

The display controller 120 is connected to the display 102, which is a typical example of a display device, and notifies the user the result of image processing in the CPU 110, and the like. In other words, the display controller 120 is connected to the display 102, and controls the display at the display 102.

The PLC interface 122 handles the data transmission between the CPU 110 and the PLC 5. More specifically, the PLC interface 122 transmits information related to the state of the production line, information related to the work, and the like controlled by the PLC 5 to the CPU 110.

The communication interface 124 handles the data transmission between the CPU 110 and the console (or personal computer or server device). The communication interface 124 typically includes the Ethernet (registered trademark), the USB (Universal Serial Bus), and the like. As hereinafter described, the programs downloaded from the distribution server and the like through the communication interface 124 may be installed in the image processing device 100 instead of the mode of installing the programs stored in the memory card 106 to the image processing device 100.

The data reader/writer 126 handles the data transmission between the CPU 110 and the memory card 106 or a recording medium. In other words, the programs and the like to be executed by the image processing device 100 are stored in the memory card 106 for circulation, and the data reader/writer 126 reads out the program from the memory card 106. The data reader/writer 126 writes the image data acquired by the imaging device 8 and/or the processing result and the like in the image processing device 100 to the memory card 106 in response to an internal command of the CPU 110. The memory card 106 includes a versatile semiconductor storage device such as a CF (Compact Flash) and an SD (Secure Digital), a magnetic storage medium such as a flexible disc, an optical storage medium such as a CD-ROM (Compact Disc Read Only Memory), and the like.

Other output devices such as a printer may be connected to the image processing device 100, as necessary.

<<C. Edge Code and Edge Code Image>>

First, the edge code and the edge code image according to the embodiment are described.

Figure 3B:
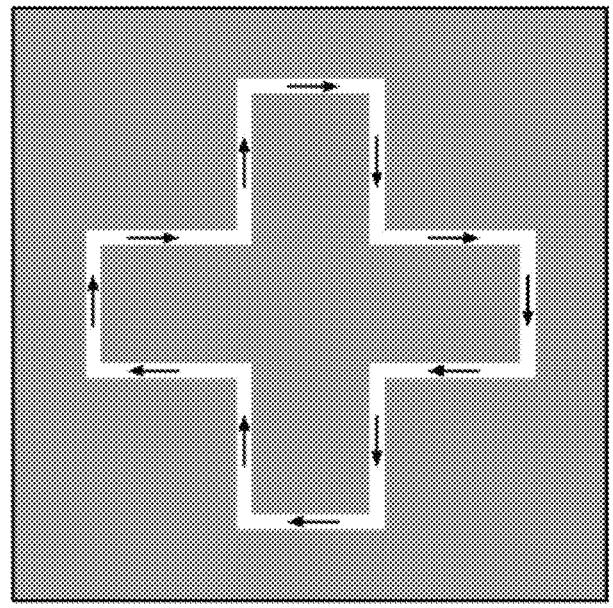
FIGS. 3A and 3B are views describing an edge code image according to an embodiment.
Figure 3A:
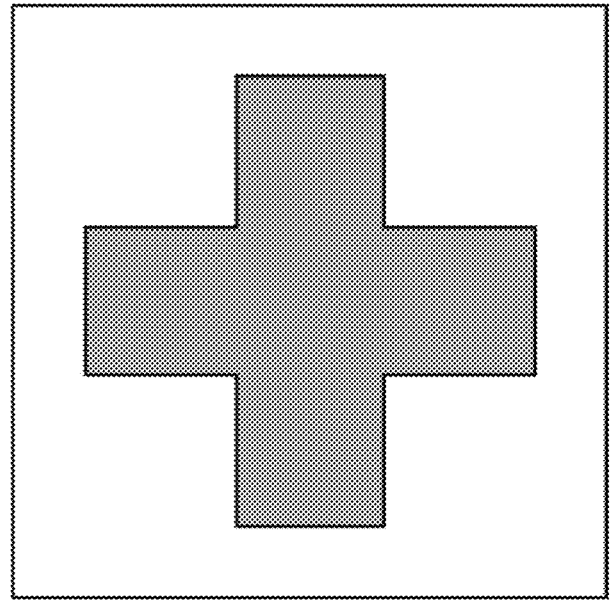

FIGS. 3A and 3B are views describing the edge code image according to the embodiment of the present invention. In particular, FIG. 3A shows one example of an input image, and FIG. 3B shows one example in which the edge code image obtained from the input image shown in FIG. 3A is visualized.

A cross-shaped object exists on a substantially uniform background in the input image shown in FIG. 3A. The object is typically a subject of the work. When the edge extraction process is performed on the input image shown in FIG. 3A, the portion (white edged portion of FIG. 3B) corresponding to the contour of the cross-shaped object as shown in FIG. 3B is extracted as the portion of high edge strength (contrast). The value indicating the changing direction (gradient direction of pixel concentration) of the extracted edge is extracted as the edge code value (EC value) at the relevant edge point.

In the embodiment, the tangential direction (i.e., direction (angle) of the arrows indicated in FIG. 3B) of the edge is calculated as the edge code (edge direction/edge angle) as one example of a value indicating the changing direction of the edge.

Figures 4A, 4B:
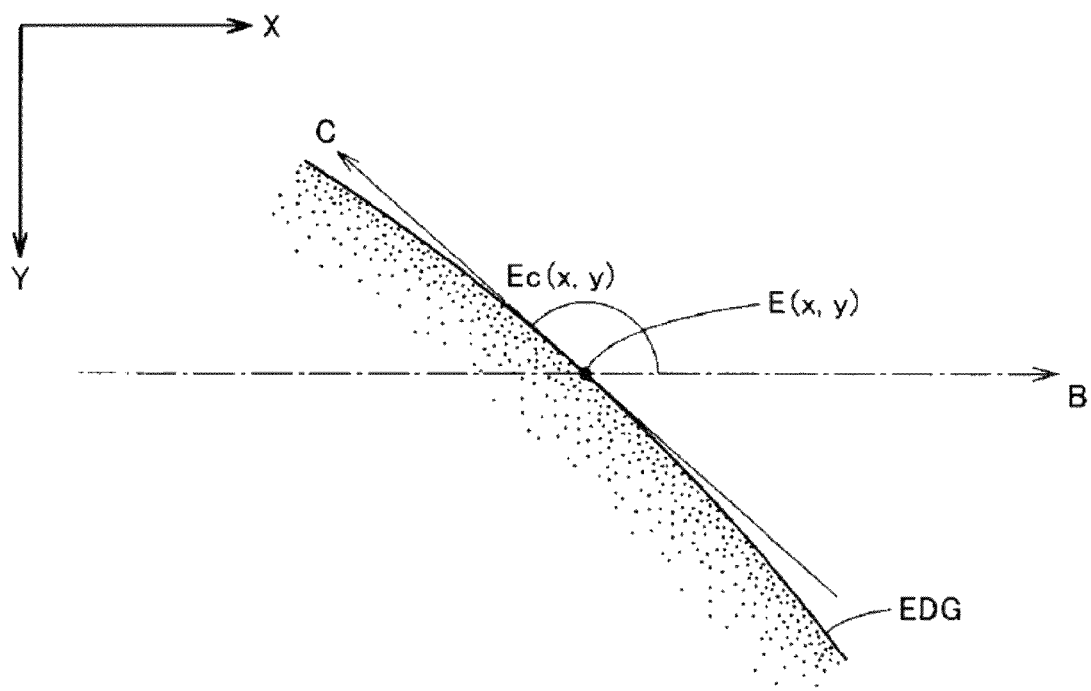
FIGS. 4A and 4B are views describing the calculation process of the edge code and the edge code image according to an embodiment.

FIGS. 4A and 4B are views describing the calculation process of the edge code and the edge code image according to an embodiment. In particular, FIG. 4A shows the method of calculating the edge code at each edge point, and FIG. 4B shows one example of a data structure of the edge code image.

Consider a case where the edge extraction process is performed by scanning in the B direction with respect to the image as shown in FIG. 4A. In the edge extraction process, the edge strength is detected based on the gray scale of the relevant pixel and the gray scales of the surrounding pixels for each pixel existing in the B direction, and the maximum value in the profile of the edge strength with respect to the B direction is extracted as the edge.

In the example shown in FIG. 4A, the edge point having a coordinate position E (x, y) is extracted as one part of the edge EDG. The direction of the edge EDG is determined based on the gray scale of the surrounding pixels of the extracted coordinate position E (x, y), and the like. In other words, the tangent vector C at the edge point of the coordinate position E (x, y) defining the edge EDG is calculated. An angle Ec (x, y) formed by the tangent vector C and the reference vector (B direction in the example shown in FIG. 4A) is calculated as the edge code. The angle Ec (x, y) may define 0° to 360° (or −180° to 180°) as an effective range, or may define 0° to 180° as an effective range. In the latter case, it is the absolute value of the angle difference of the tangent vector C and the reference vector.

An alternate method may be to calculate the changing direction of the contrasting density at the extracted edge as the edge code. In this case, the direction orthogonal to the tangent vector C shown in FIG. 4A becomes the edge code.

As described above, the combination of the coordinate position (x, y) of each extracted edge point and the corresponding edge code value (Ec (x, y)) is referred to as the "edge code image" or "EC image". In other words, each element configuring the edge code image includes the edge code value corresponding to each coordinate position of the input image, as shown in FIG. 4B.

The details are hereinafter described, but the edge code image as described above is created and registered in advance for the model used in the pattern matching process in the embodiment. The edge code image on the registered model and the edge code image generated from the input image are compared to calculate the degree of coincidence (degree of similarity) of the two. The region that most matches the model is searched based on the calculated degree of coincidence.

<<D. Search Process by Edge Code Histogram>>

One characteristic process in the pattern matching process according to the embodiment are described first.

Figure 5A:
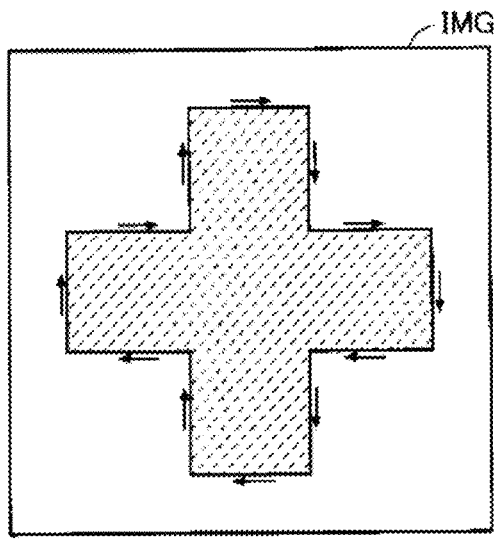
FIGS. 5A to 5D are views describing the edge code histogram search process used in the pattern matching process according to an embodiment.
Figure 5C:
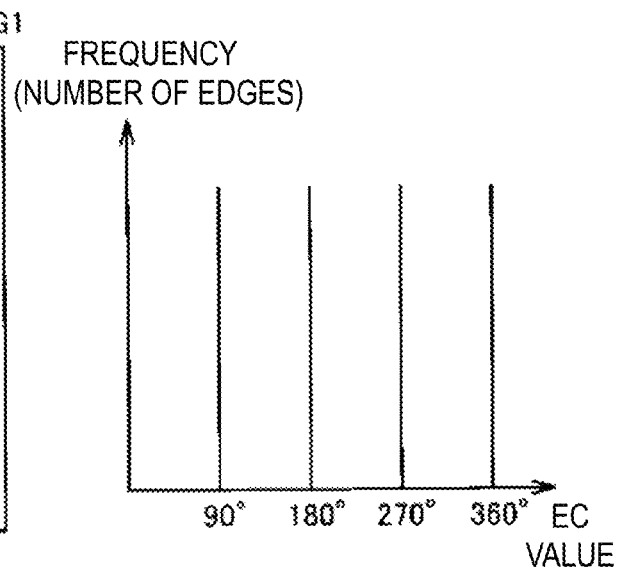
Figure 5B:
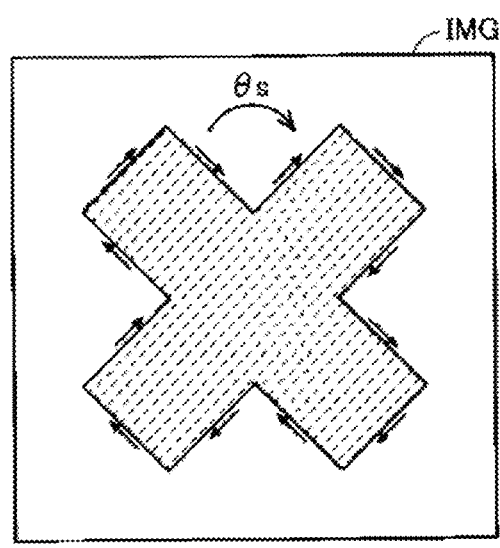
Figure 5D:
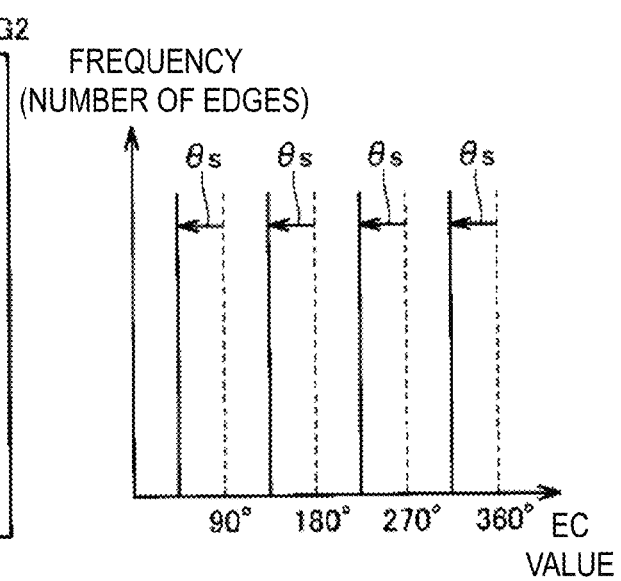

FIGS. 5A to 5D are views describing the edge code histogram search process used in the pattern matching process according to the embodiment. In particular, FIG. 5A shows a case in which a cross-shaped object exists in an input image IMG1, and FIG. 5B shows a case in which the object shown in FIG. 5A exists in an input image IMG2 in a state rotated by angle θs. FIG. 5C shows a histogram of an edge code extracted from the object shown in FIG. 5A, and FIG. 5D shows a histogram of an edge code extracted from the object shown in FIG. 5B.

When the edge extraction process is performed on the object as shown in FIG. 5A, the edge code directed in one of the directions of up, down, left, and right in the plane of the drawing is basically extracted. In other words, with the B direction shown in FIG. 4A as the reference and the counterclockwise direction as the angle in the positive direction, each edge code basically takes one of the values of 90°, 180°, 270°, and 360° (where 0° to 360° is the effective range). In this case, consider a histogram (frequency distribution) on the value for a plurality of extracted edge codes. In other words, the edge code value is shown on the horizontal axis, and the frequency of the edge code (number of edges) having the corresponding edge code value is shown on the vertical axis. The histogram (hereinafter also referred to as "edge code histogram" or "EC histogram") such as shown in FIG. 5C is obtained from the input image IMG1 shown in FIG. 5A.

It can be recognized that the peak occurs at four portions where the edge code value is 90°, 180°, 270°, and 360° in the edge code histogram shown in FIG. 5C.

Consider a case where the object shown in FIG. 5A is rotated by angle θs and appears in the input image. In other words, consider the input image IMG2 shown in FIG. 5B. In this case, each edge code contained in the object is theoretically that in which the direction thereof is rotated by the angle θs with respect to each edge code extracted from the object shown in FIG. 5A. In other words, the edge code histogram obtained from the input image IMG2 shown in FIG. 5B is as shown in FIG. 5D, and the overall shape of the histogram shown in FIG. 5D is shifted by the angle θs compared to the histogram shown in FIG. 5C.

In other words, the edge code histogram for a certain object and the edge code histogram that appears when the relevant object is rotated have a relationship such that only the relative positional relationship on the axis of the edge code value changes while maintaining the overall shape. Therefore, if the edge code histogram on a certain model is acquired and the overall shape of the acquired edge code histogram is registered as the model information, whether or not a region that matches the registered model exists in the input image can be evaluated based on such overall shape.

In the pattern matching process according to the embodiment, the time required for the process can be shortened by performing a rough search process for specifying a region (candidate point) having the possibility of matching the model in the input image using the search process based on the edge code histogram.

<<E. Overall Process Procedure>>

The procedure of the overall process in the pattern matching process according to the embodiment is described.

Figure 6:
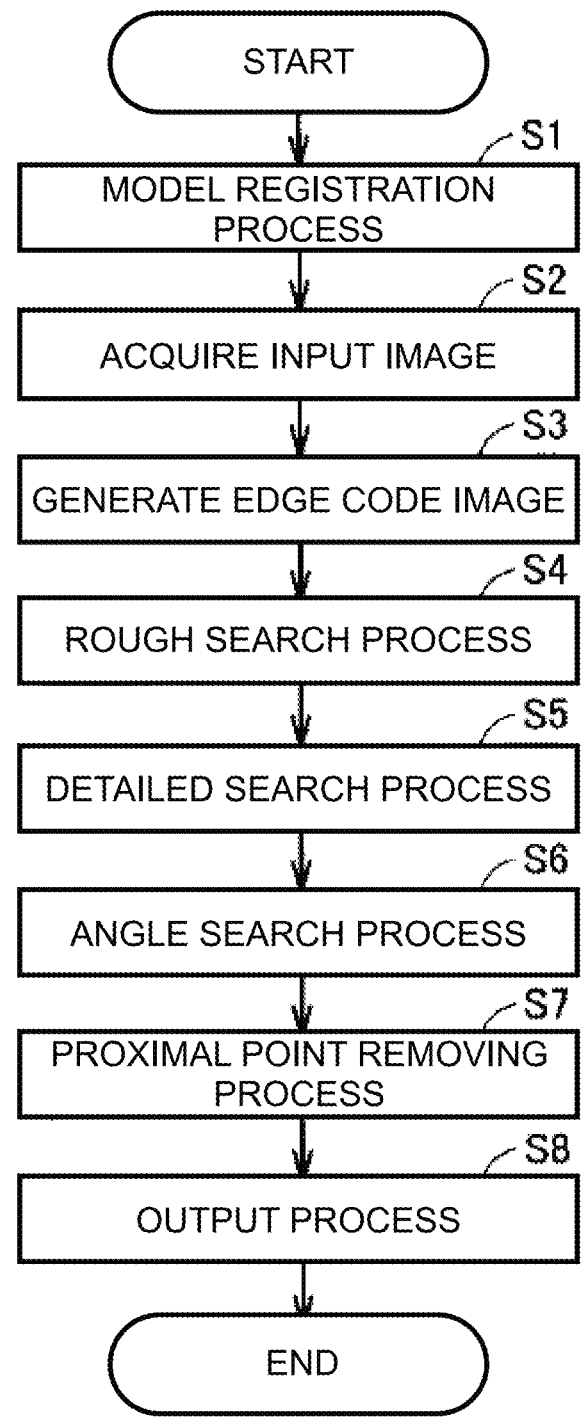
FIG. 6 is a flowchart showing the procedure of the overall process of the pattern matching process according to an embodiment.

FIG. 6 is a flowchart showing the procedure of the overall process of the pattern matching process according to the embodiment. Each step shown in FIG. 6 is provided when the CPU 110 of the image processing device 100 executes a program (command code) prepared in advance.

With reference so FIG. 6, the CPU 110 first executes a model registration process (step S1). In the model registration process, the user selects an arbitrary region as a model with respect to an input image (model image) obtained by imaging a work model, which is to be a reference. The model information is extracted from the image contained in the selected region, and recorded in the hard disc 114, and the like. The model information also includes the edge code histogram obtained from the edge code image in addition to the edge code image indicating the model. In other words, in the model registration process of step S1, the storage of the edge code histogram of the model generated from a plurality of edge codes contained in the model image representing the model, and the storage of the edge code image indicating the model are carried out.

The model registration process does not need to be carried out in the same processing procedure as the subsequent processes (steps S2 to S8), and only the model registration process may be executed in advance, and the necessary model information may be registered in advance.

Thereafter, the CPU 110 executes the pattern matching process. In other words, the CPU 110 gives a command to the imaging device 8 at a predetermined timing to acquire an input image representing the subject existing in the field of the imaging device 8 (step S2). The CPU 110 then generates an edge code image from the acquired input image (step S3).

The CPU 110 then performs the rough search process on the registered model with respect to the acquired input image (step S4). In other words, the CPU 110 specifies a region (hereinafter also referred to as "candidate point") that has toe possibility of matching the registered model in the target input image. The above-described edge code histogram is used in the rough search process.

The CPU 110 then performs the detailed search process on the registered model centering on the candidate point extracted in the rough search process with respect to the acquired input image (step S5). In the detailed search process, the edge code image of the model is used. Through the detailed search process, the position (measurement coordinate) of the region that matches the registered model is specified, and the rotation angle (candidate angle) of the object contained in the specified region and the registered model is specified. The rotation angle is discretely specified in the detailed search process of step S5, and hence the rotation angle is more specifically calculated with the specified rotation angle (candidate angle) as the basis.

In other words, the CPU 110 performs an angle search process on the registered model centering on the candidate angle acquired in the detailed search process with respect to the acquired input image (step S6). In the angle search process, the rotation angle (measurement angle) between the object contained in the specified region and the registered model is calculated to an accuracy higher than the search accuracy in the detailed search process. In other words, a more specific rotation angle is calculated by the angle search process. The above-described edge code histogram is also used in the angle search process.

The CPU 110 then performs a proximal point removing process of deleting redundant measurement results (measurement coordinate and measurement angle) acquired through the above processes (step S7). In the proximal point removing process, one of the regions proximate (i.e., redundant) to each other of the regions (measurement coordinate) that match the model specified in the above-described detailed search process is removed.

Finally, the CPU 110 performs the output process for outputting the acquired measurement coordinate and the measurement angle (step S8).

The details of each step are hereinafter described.

<<F. Control Structure>>

The control structure for the image processing device 100 according to the embodiment to perform the pattern matching process is described.

Figure 7:
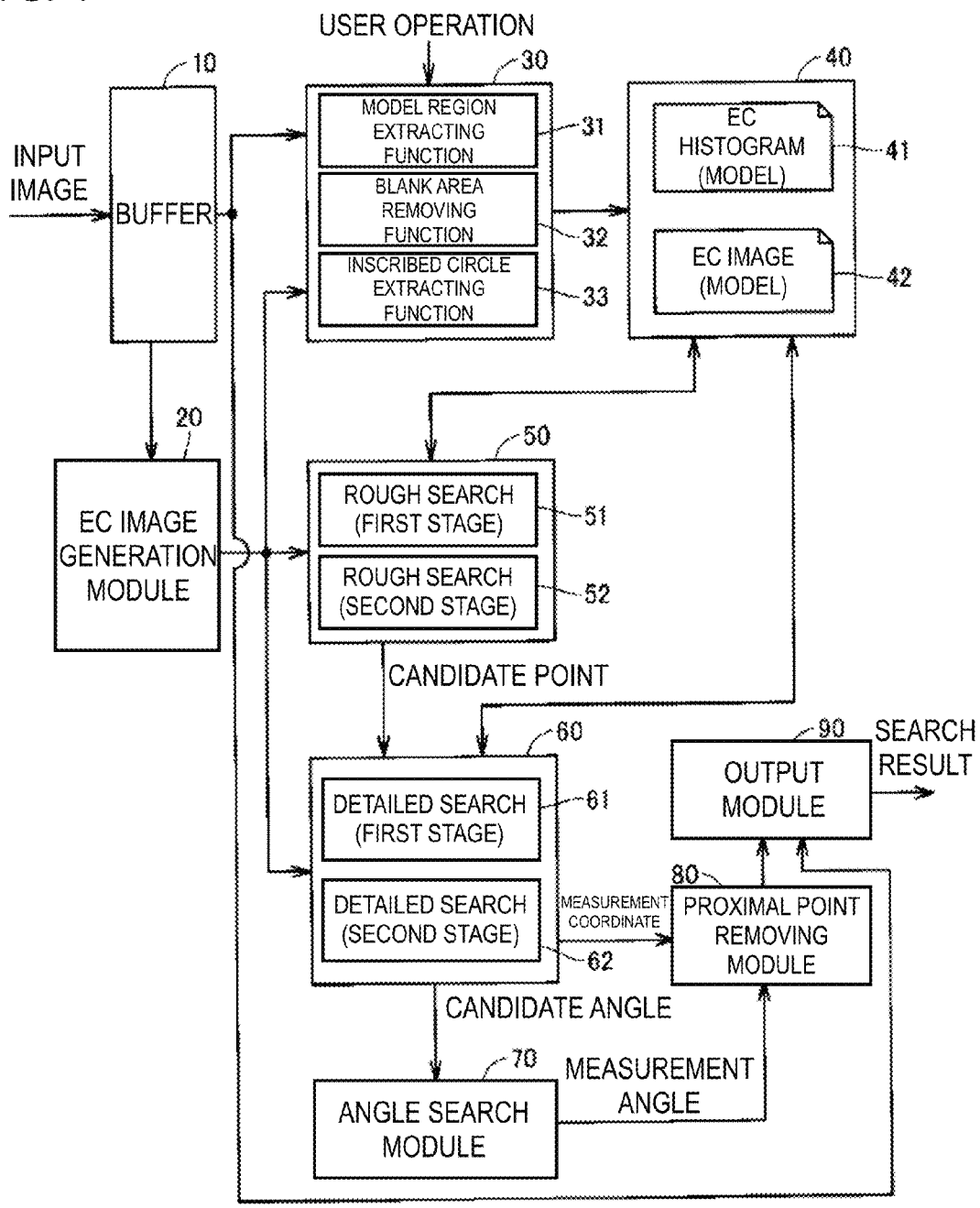
FIG. 7 is a block diagram for realizing the pattern matching process by the image processing device according to an embodiment.

FIG. 7 is a block diagram for executing the pattern matching process by the image processing device 100 according to an embodiment. Each block shown in FIG. 7 is provided by developing the program (command code) and the like stored in the hard disc 114 in the main memory 112, and having the CPU 110 execute the same. One part of or all of the modules shown in FIG. 7 may be provided by firmwear mounted on the hardware. Alternatively, one part of or all of the control structure shown in FIG. 7 may be realized by dedicated hardware and/or wiring circuits.

With reference to FIG. 7, the image processing device 100 includes a buffer 10, an edge code (EC) image generation module 20, a model registration module 30, a model information storage unit 40, a rough search module 50, a detailed search module 60, an angle search module 70, a proximal point removing module 80, and an output module 90, as a control structure.

The buffer 10 is typically provided as one part of the main memory 112, and holds the input images generated in the imaging device 8 during at least a series of processes. The input images held in the buffer 10 can be accessed from the edge code image generation module 20, the model registration module 30, and the output module 90.

The edge code image generation module 20 generates an edge code image by extracting the edge with respect to the input image held in the buffer 10 and calculating the edge code of each extracted edge. The edge code image is used in both the model registration process and the pattern matching process (measurement process).

The model registration module 30 generates the model information to be used in the pattern matching process according to the user operation. More specifically, the model registration module 30 includes a model region extracting function 31, a blank area removing function 32, and an inscribed circle extracting function 33.

The model information storage unit 40 stores the model information generated by the model registration module 30. The model information is used by the rough search module 50, the detailed search module 60, and the angle search module 70. More specifically, the model information storage unit 40 stores the edge code histogram 41 and the edge code image 42 represents the model.

The rough search module 50 extracts a region (candidate point) having a possible region that matches the registered model using the edge code histogram 41 of the model information storage unit 40 with respect to the input image to be processed. More specifically, the rough search module 50 includes a rough search (first stage) function 51 and a rough search (second stage) function 52.

The detailed search module 60 searches for the region (measurement coordinate) that matches the registered model using the edge code image 42 of the model information storage unit 40 centering on the candidate point extracted by the rough search module 50. More specifically, the detailed search module us includes a detailed search (first stage) function 61 and a detailed search (second stage) function 62.

The angle search module 70 more specifically searches for the rotation angle (measurement angle) with respect to the model of the object existing at the measurement coordinate searched by the detailed search module 60.

The proximal point removing module 80 deletes the redundant measurement result (measurement coordinate and measurement angle) extracted by the detailed search module 60 and the angle search module 70.

The output module 90 outputs the search result to the display 102 and the external device.

<<G. Model Registration Process>>

The model registration process shown in step S1 of FIG. 6 is described.

FIGS. 8A to 8D are views describing the processing content of the model registration process according to an embodiment. FIGS. 9A and 9B are views showing an example of the bias of the characteristic portion occurring at the time of model registration.

In the model registration process according to this embodiment, the model extraction is carried out to reduce the bias of the characteristic amount (edge code) indicating the model in a range for evaluating whether or not the region that matches the model exists in the input image. In other words, the model is prevented from being eccentrically located at a specific portion in the range to be cut out as a model from the input image obtained by imaging the work model. The search accuracy is thereby enhanced.

More specifically, a circular region to be searched as a model is extracted from the input image obtained by imaging the work model. This is because, since the object that appears in the input image appears with some kind of relative angle with respect to the model, influence by the eccentric location of the characteristic amount to be evaluated is to be prevented even in such case.

Figure 8A:
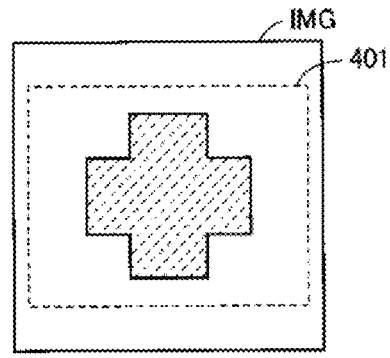
FIGS. 8A to 8D are views describing the processing content of the model registration process according to an embodiment.
Figure 9A:
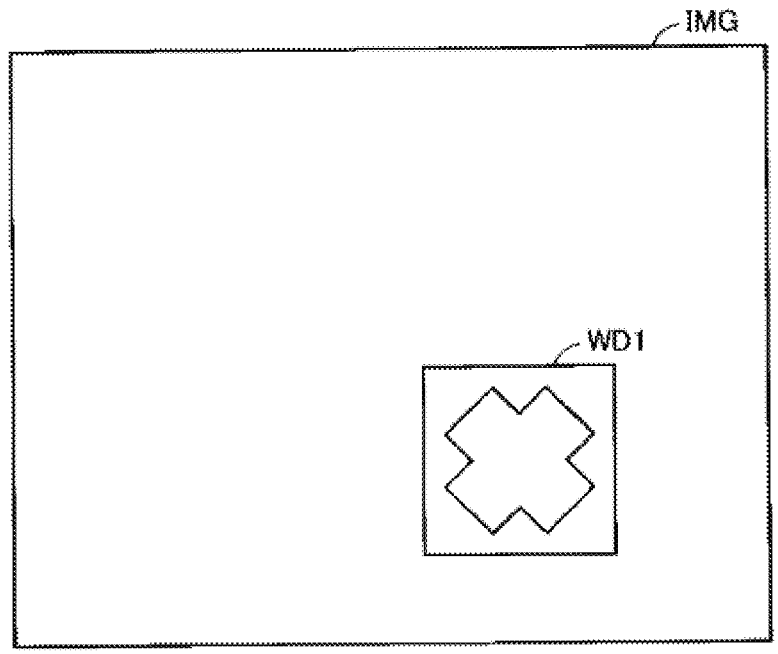
FIGS. 9A and 9B are views showing an example of when bias of the characteristic portion occurs at the time of model registration.
Figure 9B:
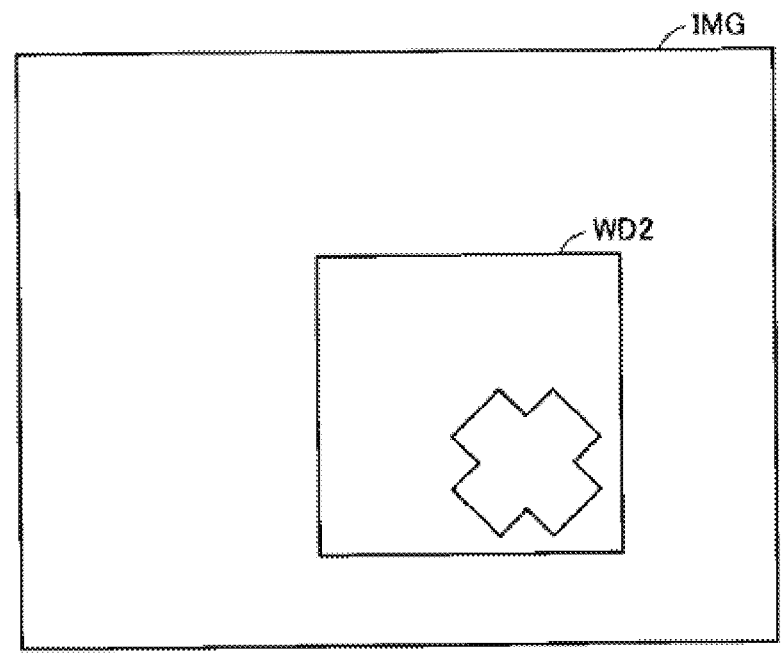

As shown in FIG. 8A, the user specifies a range 401 to register as a model with respect so the input image IMG obtained by imaging the work model. The image processing device 100 typically displays the input image (model image) obtained by imaging the work model on the display 102 and receives the range input by the user by operating the muse 104. The range 401 specified by the user is basically an arbitrary square. The user interface related to the specification of the range by the user is described later.

Figure 8B:
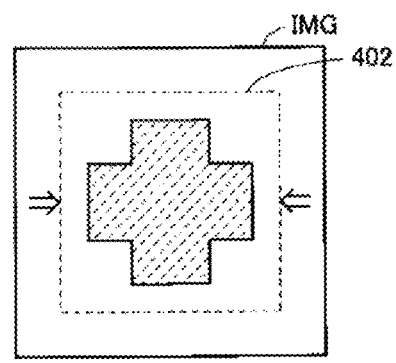

As shown in FIG. 8B, the image processing device 100 then shapes the range 401 specified by the user to a square model extracting range 402. The length on the long side of the model extracting range specified by the user is typically shortened so as to match the length on the short side.

These processes are provided by the model region extracting function 31 of the model registration module 30 shown in FIG. 7.

Figure 8C:
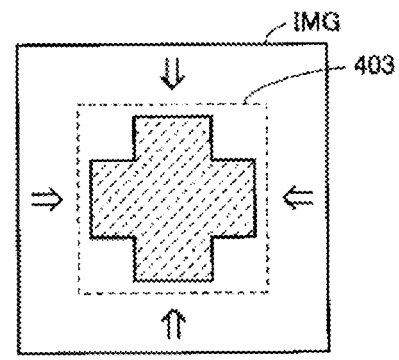

As shown in FIG. 8C, the image processing device 100 reduces the model extracting range 402 and sets the model extracting range 403 so that a blank area existing on the outer peripheral side of the model extracting range 402 after shaping is performed. The model extracting range 402 is typically reduced to the inner side up to the position where the characteristic amount (edge code) that appears in the model extracting range 402 or the edge itself exists. Alternatively, the model extracting range 402 may be reduced and the model extracting range 403 may be determined until a predetermined proportion (e.g., 95%) is contained with respect to the total number of edge points contained in the range of the model extracting range 402. This process is provided by the blank area removing function 32 of the model registration module 30 shown in FIG. 7.

The model extracting range 403 is preferably an integral multiple of the block size (n pixels×n pixels) defined in advance to reduce the amount of calculation in the rough search process to be described later.

The blank area removing function is described more specifically with reference to FIGS. 9A and 9B. In other words, the object that becomes a model exists at the central part in the model extraction region WD1 as shown in FIG. 9A. In this case, the characteristic amount of the object exists at substantially the center part in the model extracting region WD1, and hence the search process can be carried out at a relatively high accuracy even if the object so be searched in the input image appears rotated.

In the model extracting region WD2 as shown in FIG. 9B, on the other hand, the object that becomes the model exists at the lower right. In this case, the characteristic amount (edge point) of the object is eccentrically located at the lower right part of the model extracting region WD1, and hence the search accuracy may decrease depending on the rotation angle of the object to be searched in the input image IMG.

In the embodiment, the model extracting range is set so that the model is not eccentrically located, as shown in FIG. 8A to FIG. 8C.

Figure 8D:
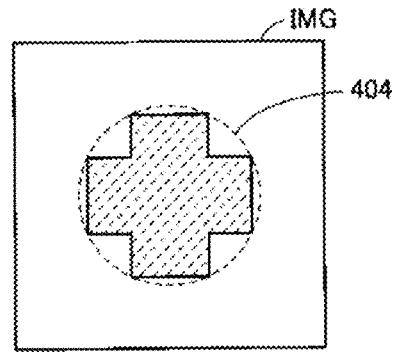

Furthermore, the image processing device 100 determines the range of the inscribed circle of the model extracting range 403 (FIG. 5C) as the final model extracting range 404, as shown in FIG. 8D. The image information contained in the model extracting range 404 is registered as the model information. This process is provided by the inscribed circle extracting function 33 of the model registration module 30 shown in FIG. 7.

The model information to be registered includes the edge code image 42 extracted with respect to the image contained in the model extracting range 404 and the edge code histogram 41 or the histogram on the edge code configuring the edge code image 42. The process of generating the edge code image and the edge code histogram is described later.

Thus, in the model registration process according to the embodiment, the specification of the region to become the model with respect to the model image is received, the region to become the specified model is shaped to a square, and the edge code histogram of the model is generated from the edge code contained in the range of the inscribed circle in the region after shaping.

The processing procedure in the model registration process described above is summarized below.

Figure 10:
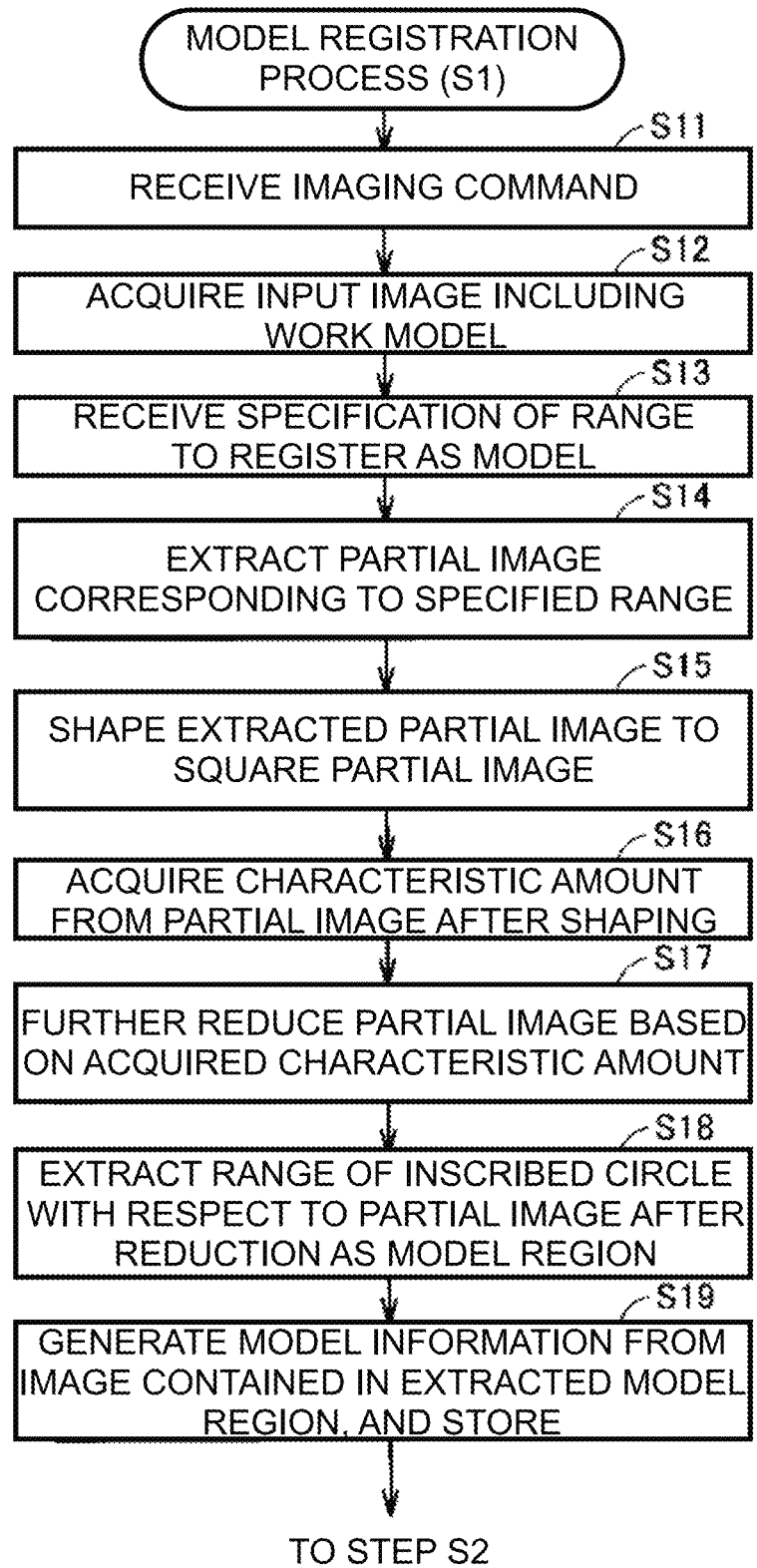
FIG. 10 is a flowchart showing the more detailed processing procedure in the model registration process according to an embodiment.

FIG. 10 is a flowchart showing a more detailed processing procedure in the model registration process according to an embodiment.

With reference to FIG. 10, the CPU 110 receives an imaging command of the work model (step S11). The user arranges the work model to become a reference in the field of the imaging device 8, and then gives the imaging command to the image processing device 100 by operating the mouse 104 and the like. In response to the imaging command of the work model, the CPU 110 gives the imaging command to the imaging device 8 to acquire the input image (model image) including the work model (step S12).

The CPU 110 then displays the input image (model image) on the display 102 and receives the specification of the range 401 to register as the model (step S13). The user operates the mouse 104 and the like to specify the range to become the model, with respect to the input image (model image) displayed on the display 102. The CPU 110 extracts the partial image corresponding to the specified range from the input image (model image) in response to the input of the range 401 to register as the model (step S14).

The CPU 110 then shapes the extracted partial image to a square partial image (step S15). The CPU 110 also acquires the characteristic amount from the partial image after shaping in step S15 (step S16). The CPU 110 typically performs the edge extraction process on the partial image to acquire the edge point contained in the partial image. The CPU 110 also further reduces the partial image so as to remove the blank portion based on the characteristic amount acquired in step S16 (step S17).

Lastly, the CPU 110 extracts the range of the inscribed circle with respect to the partial image after being reduced in step S17 as the model region (step S18). The model information is generated from the image contained in the model region extracted in step S18, and stored in the hard disc 114 and the like (step S19). The process then proceeds to step S2 of FIG. 6.

<<H. Edge Code Image Generation Process>>

The edge code image generation process shown in step S3 of FIG. 6 is described.

Figure 11:
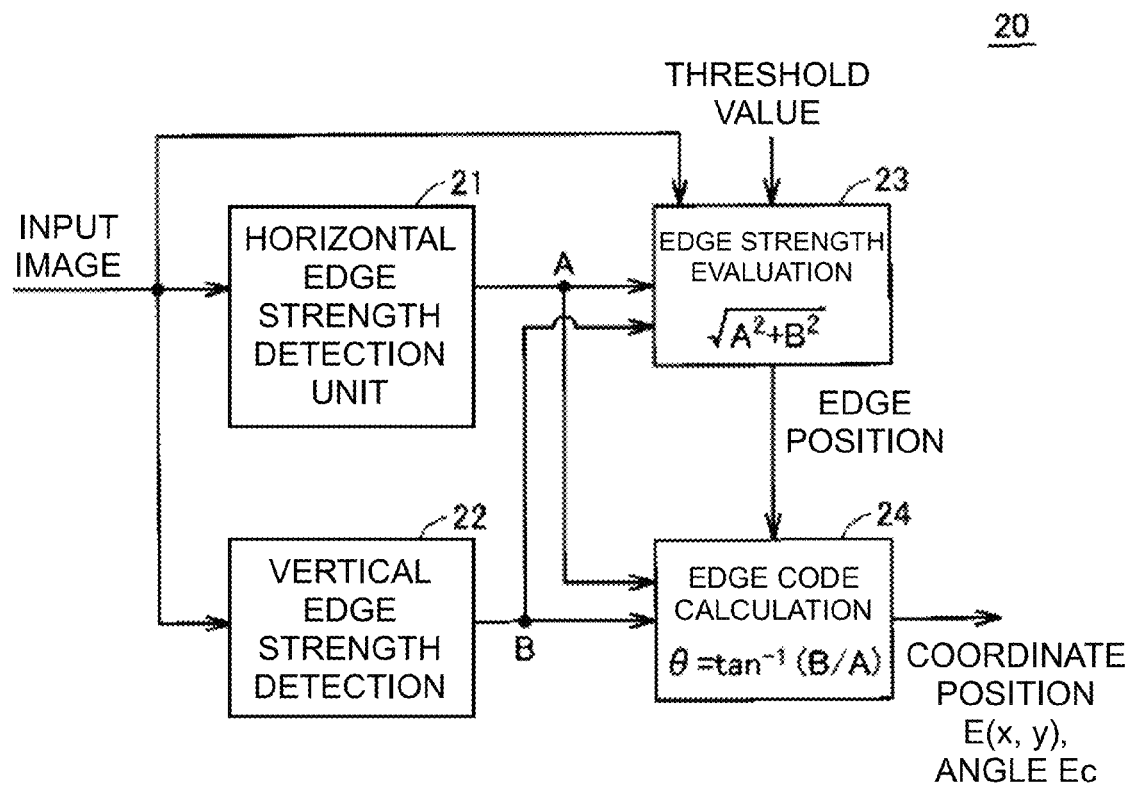
FIG. 11 is a block diagram showing a more detailed function of the edge code image generation module shown in FIG. 7.

FIG. 11 is a block diagram showing a more detailed function of the edge code image generation module 20 shown in FIG. 7. With reference to FIG. 11, the edge code image generation module 20 includes a horizontal edge strength detection unit 21, a vertical edge strength detection unit 22, an edge strength evaluation unit 23, and an edge code calculation unit 24.

The horizontal edge strength detection unit 21 calculates the edge strength in the horizontal direction (horizontal edge strength A) based on the gray value of the adjacent pixels for each pixel, contained in the input image. Similarly, the vertical edge strength detection unit 22 calculates the edge strength in the vertical direction (vertical edge strength B) based on the gray value of the adjacent pixels for each pixel contained in the input image. A known method can be adopted for the process of calculating the edge strength, where the maximum value of the difference in gray scale between the adjacent pixels is the edge strength.

The edge strength evaluation unit 23 calculates the edge strength in each pixel of the input image based on the horizontal edge strength A and the vertical edge strength B calculated by the horizontal edge strength detection unit 21 and the vertical edge strength detection unit 22, respectively. More specifically, the edge strength evaluation unit 23 calculates the edge strength according to the following equation (1).

$$\text{edge strength} = (A^2 + B^2)^{1/2} \quad (1)$$

The edge strength evaluation unit 23 also compares the edge strength calculated according to equation (1) and a threshold value set in advance. The edge strength evaluation unit 23 determines the target portion as the edge if the calculated edge strength is greater than the threshold value. The edge strength evaluation unit 23 then provides the coordinate (x, y) of the region determined as the edge to the edge code calculation unit 24 as an edge point.

The edge code calculation unit 24 calculates the edge code value at the portion determined as the edge based on the horizontal edge strength A and the vertical edge strength B calculated by the horizontal edge strength detection unit 21 and the vertical edge strength detection unit 22, respectively. More specifically, the edge code calculation unit 24 calculates the angle Ec according to the following equation (2).

$$\text{angle } Ec = \tan^{-1}(B/A) \quad (2)$$

The following equation (2') may be used when defining the edge code value in the range of 0° to 180°.

$$\text{angle } Ec = \tan^{-1}|B/A| \quad (2')$$

The edge code calculation unit 24 then combines the coordinate (x, y) of the portion determined as the edge obtained from the edge strength evaluation unit 23 and the calculated angle Ec, and outputs the result as the edge code (edge code image).

The processing procedure in the edge code image generation process described above is summarized below.

Figure 12:
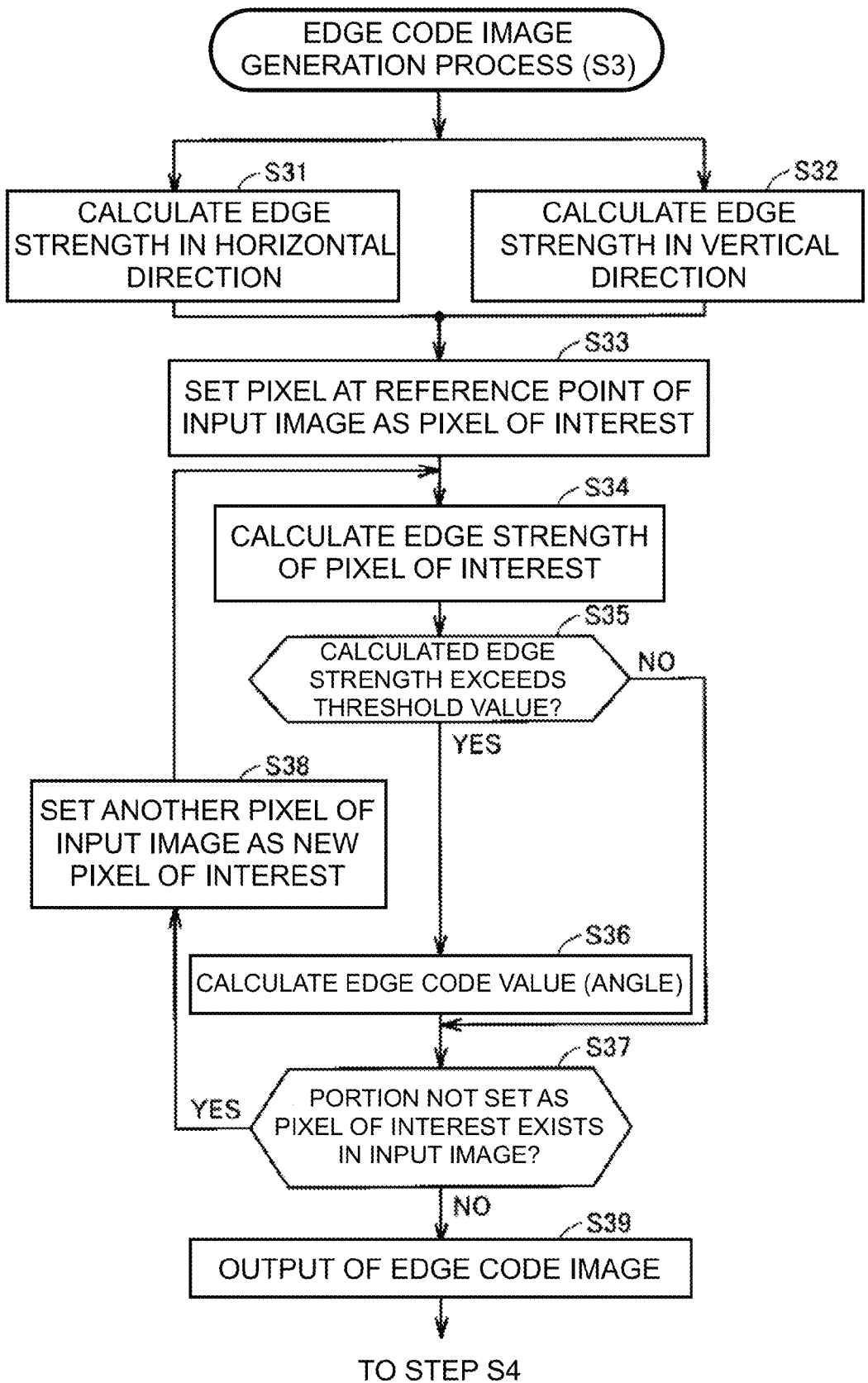
FIG. 12 is a flowchart showing a more detailed processing procedure in the edge code image generation process according to an embodiment.

FIG. 12 is a flowchart showing the more detailed processing procedure in the edge code image generation process according to the embodiment of the present invention.

With reference to FIG. 12, the CPU 110 calculates the edge strength in the horizontal direction for every pixel (step S31), and calculates the edge strength in the vertical direction for every pixel (step S32) with respect to the input image. The processes of steps S31 and S32 may be executed in series but a parallel process is preferably carried out since such processes can be basically carried out independent from each other.

The CPU 110 then sets a pixel (typically, pixel at (0, 0)) of the reference point of the input image as the pixel of interest (step S33). The CPU 110 then calculates the edge strength of the pixel of interest using the horizontal edge strength and the vertical edge strength (calculated in steps S31 and S32) for the pixel of interest (step S34). Furthermore, the CPU 110 determines whether or not the edge strength calculated in step S34 exceeds a threshold value set in advance (step S35). If the calculated edge strength exceeds the threshold value set in advance (YES in step S35), the CPU 110 calculates the angle or the edge code value using the horizontal edge strength and the vertical edge strength for the pixel of interest (step S36).

If the calculated edge strength does not exceed the threshold value set in advance (NO in step S35), the process of step S36 is skipped.

The CPU 110 then determines whether or not the portion not set as the pixel of interest exists in the input image (step S37). If the portion not set as the pixel of interest exists in the input image (YES in step S37), the CPU 110 sets another pixel of the input image as a new pixel of interest (step S38). The processes of step S34 and after are then repeated.

If the portion not set as the pixel of interest does not exist in the input image (NO in step S37), that is, if the determination on all the pixels contained in the input image is completed, the CPU 110 forms a set of the respective angle calculated in step S36 and the coordinate position of the pixel of interest corresponding to each angle, and outputs the same as the edge code image (step S39). The process then proceeds to step 34 of FIG. 12.

<<I. Rough Search Process>>

The rough search process shown in step S4 of FIG. 6 is described.

Figure 13A:
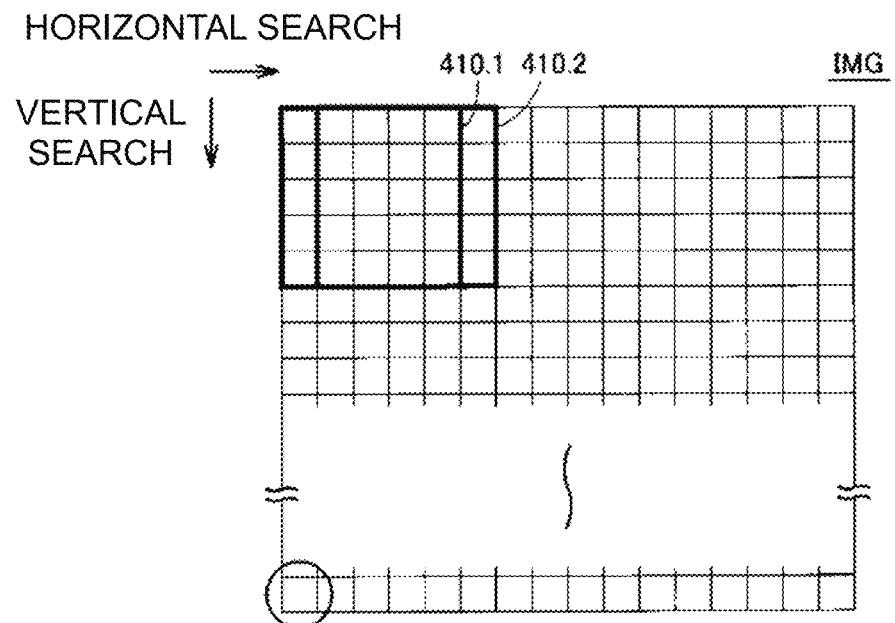
FIGS. 13A and 13B are views describing the region of interest set in the rough search process according to an embodiment.
Figure 13B:
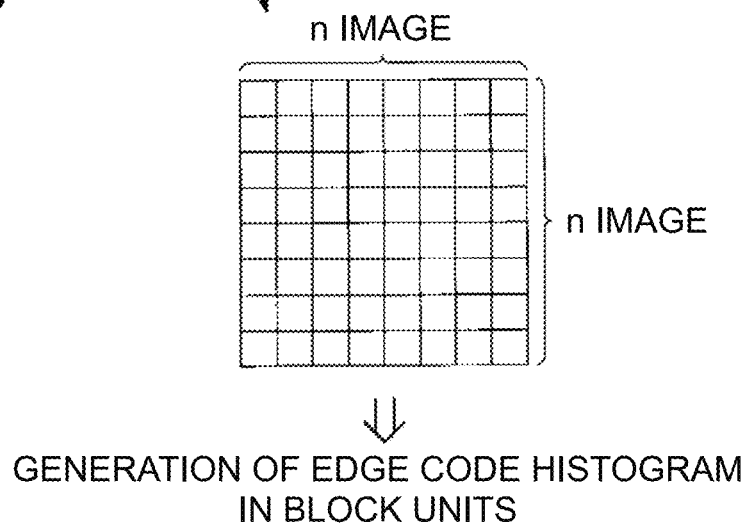
Figures 14A, 14B:
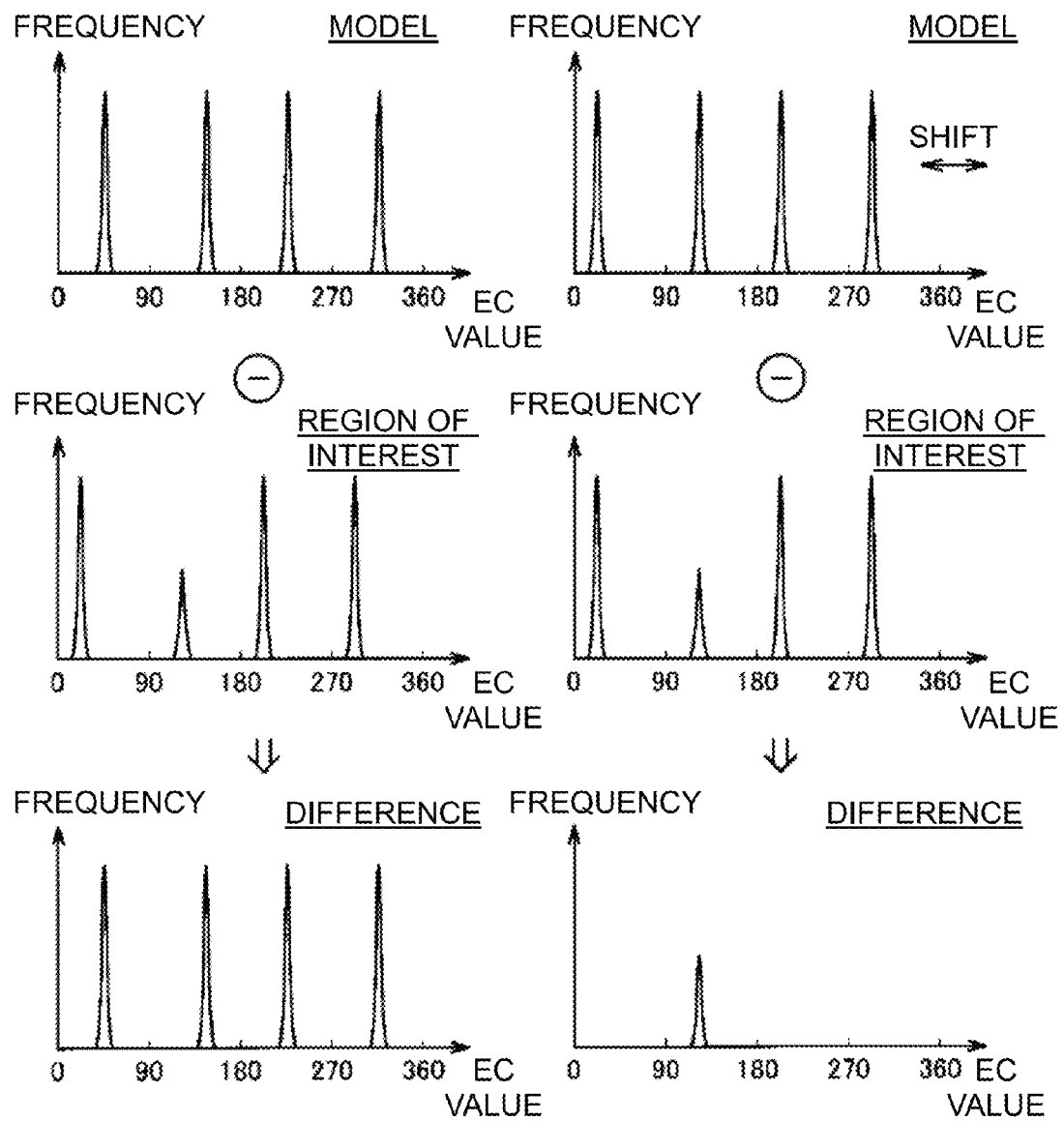
FIGS. 14A and 14B are views describing a comparison process on the edge code histogram in the rough search process according to an embodiment.
Figure 15:
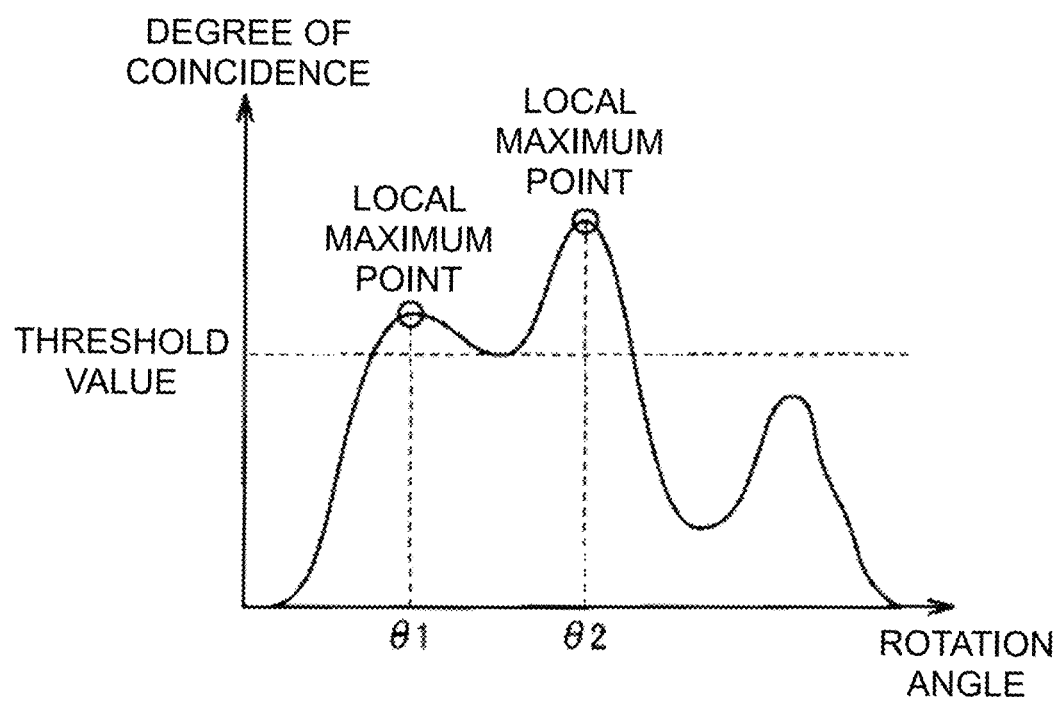
FIG. 15 is a view showing one example of a result obtained by the comparison result of the edge code histogram shown in FIG. 14.

FIGS. 13A and 13B are views describing the region of interest set in the rough search process according to the embodiment. FIGS. 14A and 14B are views describing a comparison process on the edge code histogram in the rough search process according to the embodiment. FIG. 15 is a view showing one example of a result obtained by the comparison result of the edge code histogram shown in FIG. 14.

In the rough search process according to the embodiment, the portion (candidate point) having a possible region that matches the registered model exists is searched through the search process using the edge code histogram as shown in FIGS. 5A to 5D. In particular, the rough search process is executed in two stages from the standpoint of reducing the processing time in the rough search process (rough search (first stage) function 51 and rough search (second stage) function 52) shown in FIG. 7).

First, in the rough search process according to the embodiment, as shown in FIG. 13A, the region of interest 410.1, 410.2, . . . (hereinafter collectively referred to as "region of interest 410") is sequentially set with respect to the input image IMG, and the edge code histogram obtained from the partial image contained in the region of interest 410 and the edge code histogram 41 (FIG. 7) representing the model registered in advance are sequentially compared. As hereinafter described, the interval (movement amount) for setting the region of interest 410 differs between the first stage and the second stage of the rough search process.

The size of the region of interest 410 is basically the same size as the model extracting range 403 shown in FIG. 8C.

As described above, the edge code value is stored in correspondence with the pixel determined as the edge point in the edge code image generated from the input image by the edge code image generation module 20 (FIG. 6). The edge code value on the edge point contained in the region may be collected and the edge code histogram may be generated every time the region of interest 410 is set, but the edge code histogram is generated in each block unit after partitioning the input pixels to a plurality of blocks in advance in the embodiment.

More specifically, as shown in FIG. 13B, the edge code histogram on the block is generated in advance from the edge code value on the pixel contained in each block with n pixels×n pixels as one block unit.

In other words, in the generation process of the edge code histogram, the input image is divided into blocks of a block size defined in advance, the edge code histogram is generated for each block, and the edge code histogram for one or a plurality of blocks existing in the set region of interest 410 is added for every setting of the region of interest 410 with respect to the input image to generate the edge code histogram for the relevant region of interest 410. The size of the region of interest 410 is assumed to be set to an integral multiple of the block size.

If the edge code histogram is generated in advance in block units, the edge code histogram on the relevant region of interest 410 can be generated in a short time by simply integrating the histogram corresponding to each of the plurality of blocks in the set region of interest 410 by edge code value even if the region of interest 410 is sequentially set at different positions, as shown in FIG. 13A.

The content of a specific evaluation process is described with reference to FIG. 14 and FIG. 15.

As described above, in the rough search process according to the embodiment, the portion that matches the model is searched by comparing the edge code histogram of the model and the edge code histogram on the partial image contained in the region of interest 410.

FIGS. 14A and 14B show an example of the evaluation process when the region of interest 410 is set at a certain position of the input image IMG. As shown in FIG. 14A, the difference of the edge code histogram on the partial image contained in the region of interest 410 set at a predetermined position with respect to the edge code histogram of the model registered in advance is calculated. In other words, the difference in frequency (number of edges) is calculated for each corresponding edge code value with respect to the two edge code histograms. When the calculated difference value is negative (i.e., when the frequency of the region of interest 410 is greater than the frequency of the model for a certain edge code value), such difference value is handled as zero. This is to avoid the influence of noise mixed in the input image and to simplify the process.

The more the partial image contained in the region of interest 410 differs from the model registered in advance the greater the area (cumulative value of frequency) of the histogram of such difference. In other words, the area of the difference histogram becomes the index indicating the "degree of non-coincidence" between the model and the partial image contained in the region of interest 410.

As described with reference to FIGS. 5A to 5D, the edge code histogram shifts while maintaining the overall shape according to the rotation angle of the corresponding object in the input image. The object to be searched in the region of interest 410 may exist in a state rotated by a certain angle with respect to the registered model. In the rough search process according to the embodiment, therefore, the relative positional relationship (edge code value/angle) between the edge code histogram of the model and the edge code histogram on the partial image contained in the region of interest 410 is sequentially changed, and whether they have an approximate overall shape is determined.

In other words, as shown in FIG. 14B, the edge code histogram on the model is shifted by a predetermined angle and the difference histogram in the state after each shift is evaluated. Since the edge code value is an angle, one rotation is 360° (or 180°). Thus, increasing and decreasing the rotation angle changes which position to be set as a reference (zero) with respect to the edge code histogram.

In FIG. 14B, a state in which the overall shape of the edge code histogram of the model and the overall shape of the edge code histogram on the partial image contained in the region of interest 410 are substantially matched. In this case, a relatively small amplitude waveform merely appears for the difference histogram, and the area of the histogram becomes small.

FIG. 14B shows a processing example in which the edge code histogram of the model is fixed and the edge code histogram on the partial image contained in the region of interest 410 is shifted, but the edge code histogram on the partial image contained in the region of interest 410 may be fixed and the edge code histogram of the model may be shifted. In other words, either method may be adopted as long as the relative positional relationship (angle) between the two edge code histograms is changed.

FIG. 15 shows the change in the degree of coincidence calculated when the relative positional relationship (angle) between the two edge code histograms is changed in plural ways. The "degree of coincidence" shown in FIG. 15 is the concept at extreme opposite to "degree of non-coincidence" mentioned above, and is calculated as the inverse number of the "degree of non-coincidence" ("degree of coincidence"

1/"degree of non-coincidence") or as the deviation from the maximum value of the "degree of non-coincidence" ("degree of coincidence"=maximum value of degree of non-coincidence−"degree of non-coincidence").

In other words, the "degree of coincidence" between the edge code histograms in the embodiment is calculated from the cumulative value (area) of the frequency in the difference histogram between the two target edge code histograms.

As shown in FIG. 15, if the degree of coincidence obtained by sequentially shifting the relative positional relationship between the edge code histogram of the model and the edge code histogram on the partial image contained in the region of interest 410 exceeds a predetermined threshold value, the possibility that the object approximate to the model exists in the region of interest 410 is high.

If the object approximate to the model registered in advance exists in the region of interest 410, the degree of coincidence increases at one of the rotation angles. In the example shown in FIG. 15, the degree of coincidence increases at rotation angles θ1 and θ2 (local maximum point).

Thus, in the first stage of the rough search process according to the embodiment, the set position of the region of interest 410 is extracted as a candidate point of the first stage if the maximum value of the degree of coincidence obtained by sequentially shifting the relative positional relationship between the edge code histogram on the partial image contained in the region of interest 410 and the edge code histogram of the model for each set region of interest 410 exceeds a predetermined threshold value.

In the extracting process of the candidate point of the first stage, whether the minimum value of the degree of non-coincidence obtained by sequentially shifting the relative positional relationship between the edge code histogram on the partial image contained in the region of interest 410 and the edge code histogram of the model is smaller than a threshold value may be determined.

In the second stage of the rough search process according to the embodiment, the position where the maximum value of the degree of coincidence obtained by sequentially shifting the relative positional relationship between the two edge code histograms exceeds a predetermined threshold value is extracted as a candidate point of the second stage, and the rotation angle corresponding to the local maximum point of the degree of coincidence is extracted as a candidate angle at the candidate point. The rotation angle corresponding to the maximum point of the degree of coincidence may be extracted, but if the model has a symmetrical shape, the degree of coincidence becomes relatively large even if the object of the input image is rotated 180° with respect to the model. Thus, there is a possibility the rotation angle to be originally extracted may be excluded if only the rotation angle corresponding to the maximum point of the degree of coincidence is extracted. Therefore, in the stage of the rough search process, the rotation angle at which the local maximum value occurs is extracted as the candidate angle so that the rotation angle having such possibility is not excluded.

The first stage and the second stage of the rough search process are described below.

Figure 16A:
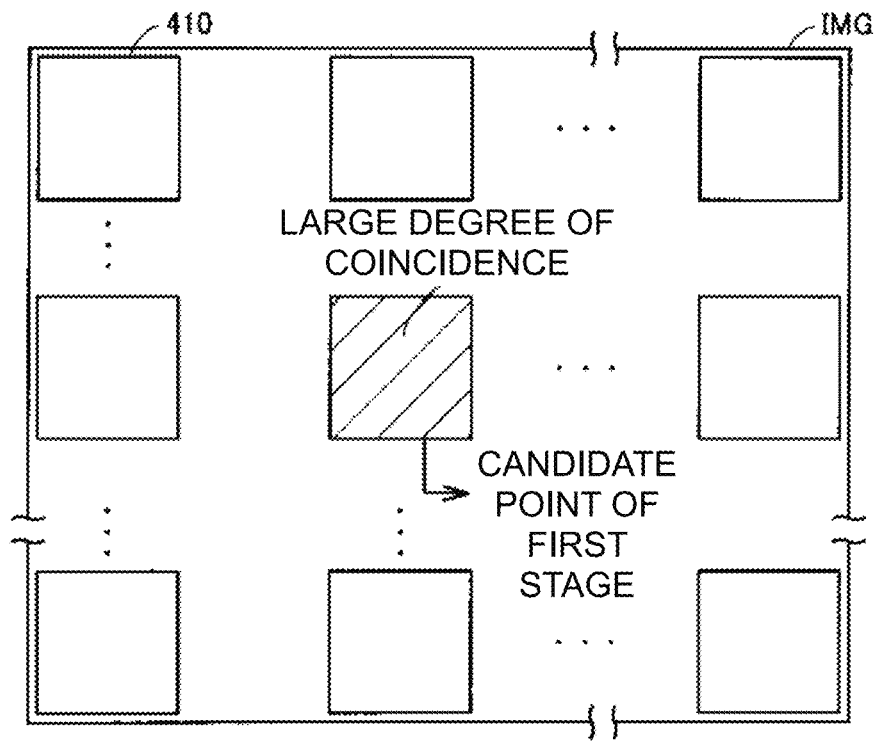
FIGS. 16A and 16B are views describing the contents of the first stage and the second stage in the rough search process according to an embodiment.
Figure 16B:
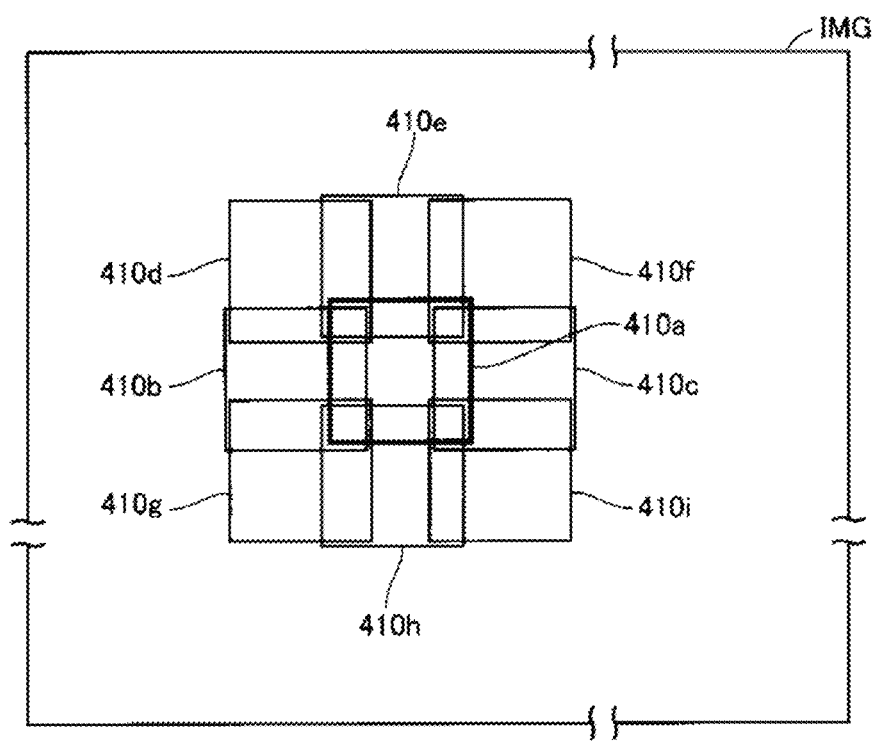

FIGS. 16A and 16B are views describing the contents of the first stage and the second stage in the rough search process according to the embodiment. In particular, FIG. 16A shows the process of setting the region of interest 410 in the first stage of the rough search process, and FIG. 16B shows the process of setting the region of interest 410 in the second stage of the rough search process.

As shown in FIG. 16A, the region of interest 410 is sequentially set at a relatively wide interval with respect to the input image IMG in the first stage of the rough search process (rough search (first stage) function 51 of FIG. 7). The interval (movement, amount) of setting the region of interest 410 may be an integral multiple (e.g. twice) of the "movement amount" set by the user, to be described later.

In the first stage of the rough search process, that in which the degree of coincidence obtained for each region of interest 410 of the plurality of set regions of interest 410 exceeds a threshold value of the first stage is extracted as a candidate point of the first stage, and the rotation angle corresponding to the local maximum point that appears in the change of the degree of coincidence for the first candidate point is extracted as a candidate angle of the first state.

In the second stage of the rough search process (rough search (second stage) function 52 of FIG. 7), a plurality of region of interest 410b to 410i are set in the vicinity of the center, the center being the region of interest 410a corresponding to the candidate point, of the first stage, as shown in FIG. 16B. The number of region of interests to be set in the vicinity is not limited so eight, as shown in FIG. 16B, and can be appropriately set according to the processing accuracy and the processing speed.

The change in the degree of coincidence obtained by sequentially shifting the relative positional relationship between the edge code histograms is calculated for each region of interest 410a to 410i, similar to the above. In this case, the change in the degree of coincidence in a predetermined range having the corresponding candidate angle (shift angle) of the first stage extracted in the first stage of the rough search process as the center is calculated. In other words, the change in the degree of coincidence to be calculated is not all the rotation angles but is limited to a predetermined range having the candidate angle of the first stage as the center.

Furthermore, the region of interest in which the degree of coincidence obtained for each region of interest exceeds a threshold value of a second stage of the plurality of set regions of interest 410a to 410i is extracted as a candidate point of the second stage, and the rotation angle corresponding to the local maximum point that appears in the change in the degree of coincidence for the second candidate point is extracted as a candidate angle of the second stage.

Since a great number of candidate points may be extracted in the input image with only the above-described conditions, only the candidate point of the second stage extracted in a cluster in the input image is preferably assumed as the candidate point by the rough search process. Specifically, a clustering process is performed on the set of extracted second candidate points to classify them into groups. The candidate point is then extracted from the group including a predetermined number of second candidate points by the rough search process. In this case, the second candidate angle corresponding to the extracted second candidate point is also extracted.

The coordinate position (x, y) and the candidate angle (second candidate angle) θ of the candidate (second candidate point) extracted by the rough search process are then used in the detailed search process of the post stage.

In other words, in the rough search process according to the embodiment, the setting of the region of interest 410 with respect to the input image, the generation of the edge code histogram on the region of interest 410, and the relative positional relationship between the edge code histogram of the model and the edge code histogram on the region of interest 410 are sequentially changed, and the degree of coincidence (change thereof) is calculated through the procedure of sequentially calculating the degree of coincidence between the edge code histograms at each relative position. The possibility that the region that matches the model is included in the set region of interest 410 is evaluated from the change in the degree of coincidence between the calculated edge code histograms. Such process is sequentially set while changing the position of the region of interest 410 with respect to the input image and the evaluation is repeated for each region of interest 410 to thereby specify the candidate point having the possibility of matching the model in the input image.

In the rough search process of the first stage, the candidate point is temporarily determined in units of a first interval by sequentially arranging the region of interests 410 at the first interval with respect to the input image. In the rough search process of the second stage, the candidate point is determined in units of a second interval by sequentially arranging the region of interests 410 at the second interval shorter than the first interval at a plurality of proximate positions including the temporarily determined candidate with respect to the input image. In the rough search process of the second stage, the rotation angle corresponding to the relative positional relationship between the edge code histogram of the model and the edge code histogram on the region of interest 410 in which the degree of coincidence between the edge code histograms takes a local maximum value is determined as the candidate angle corresponding to the relevant candidate point.

The processing procedure in the rough search process is summarized below.

Figure 17:
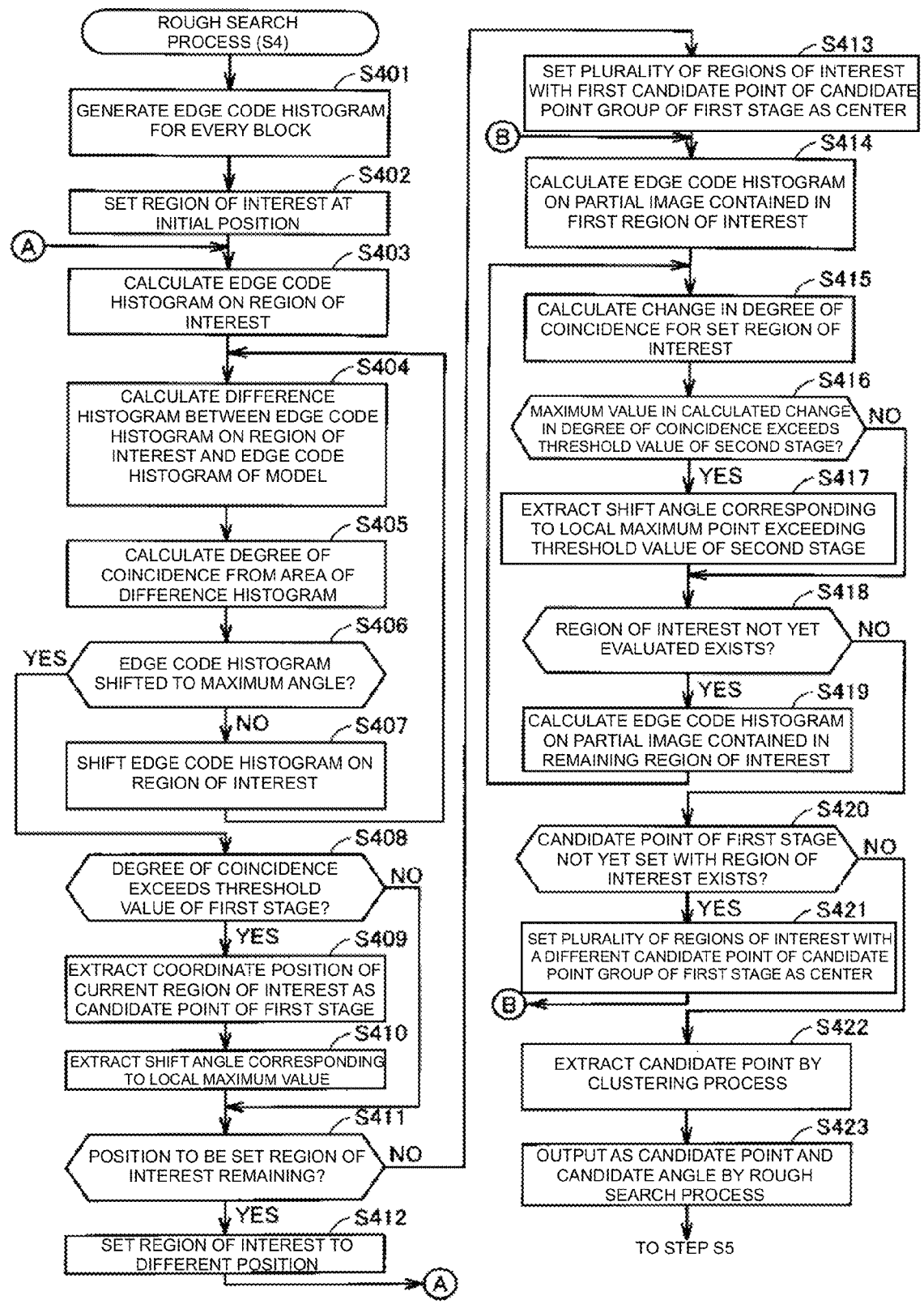
FIG. 17 is a flowchart showing a more detailed processing procedure in the rough search process according to an embodiment.

FIG. 17 is a flowchart showing a more detailed processing procedure in the rough search process according to the embodiment of the present invention.

With reference to FIG. 17, the CPU 110 generates an edge code histogram for every block as shown in FIGS. 13A and 13B based on the edge code image generated in the edge code image generation process (step S401).

The CPU 110 first executes the rough search process of the first stage. In other words, the CPU 110 sets the region of interest 410 at an initial position (step S402). The CPU 10 then calculates an edge code histogram on a partial image contained in the region of interest 410 from the edge code histogram on each of a plurality of blocks in the set region of interest 410 (step S403).

The CPU 110 then calculates a difference histogram between the edge code histogram on the partial image contained in the region of interest 410 and the edge code histogram of the registered model (step S404). The CPU 110 calculates the degree of coincidence from the area of the calculated difference histogram (step S405). The degree of coincidence to be calculated is stored in correspondence with the shift angle at the relevant time point.

The CPU 110 determines whether or not the original edge code histogram on the partial image contained in the region of interest 410 is shifted to a maximum angle (step S406). In other words, whether or not evaluation is completed on all the degrees of coincidence obtained by sequentially shifting the relative positional relationship between the edge code histogram of the model and the edge code histogram on the partial image contained in the region of interest 410 is determined.

If the original edge code histogram on the partial image contained in the region of interest 410 is not shifted to the maximum angle (NO in step S406), the CPU 110 shifts the edge code histogram on the partial image contained in the region of interest 410 by a predetermined angle and generates a new edge code histogram (step S407). The processes after step S404 are then repeated.

If the original edge code histogram on the partial image contained in the region of interest 410 is shifted to the maximum angle (YES in step S406), the process proceeds to step S408. The change in the degree of coincidence with respect to the shift angle is acquired at this time point.

In step S408, the CPU 110 determines whether or not the calculated degree of coincidence exceeds a threshold value of the first stage (steps S408).

If the calculated degree of coincidence exceeds the threshold value (YES in step S408), the CPU 110 extracts the coordinate position of the currently set region of interest 410 as the candidate point of the first stage (step S409). The CPU 110 then extracts the shift angle (rotation angle) corresponding so the local maximum point that appears in the change in the degree of coincidence as the candidate angle of the first stage. The process then proceeds to step S411.

If the calculated degree of coincidence does not exceed the threshold value of the first stage (NO in step S408), the processes of steps S409 and S410 are skipped, and the process proceeds to step S411.

In step S411, the CPU 110 determines whether the position to be set the region of interest 410 is left (step S411). If the position to be set the region of interest 410 is left (YES in step S411), the CPU 110 sets the region of interest 410 at another position (step S412). The processes after step S403 are then repeated.

If the number of edge points defining the edge code histogram calculated in step S403 is sufficiently small compared to the number of edge points extracted from the model, the processes of steps S404 to S410 on the relevant region of interest 410 may be skipped.

If the position to be set the region of interest 410 is not left (NO in step S411), that is, if the evaluation on all the region of interests 410 to be set in the first stage of the rough search process is completed, the CPU 110 executes the rough search process of the second stage based on the extracted candidate point of the first stage.

In other words, the CPU 110 sets a plurality of regions of interest 410 with the first candidate point of the acquired candidate point group of the first stage as the center (step S413).

Then, the edge code histogram on the partial image contained in the first region of interest 410 of the plurality of set region of interests 410 is calculated (step S414).

The relative positional relationship between the calculated edge code histogram and the edge code histogram of the registered model is sequentially shifted to calculate the change in the degree of coincidence on the relevant region of interest 410 (step S415). In this case, the CPU 110 calculates the change in the degree of coincidence in a predetermined range centering on the candidate angle (shift angle) of the first stage corresponding to the currently set candidate point of the first stage.

The CPU 110 then determines whether or not the maximum value in the calculated change in the degree of coincidence exceeds a threshold value of the second stage (step S416). If the maximum value in the calculated change in the degree of coincidence exceeds the threshold value of the second stage (YES in step S416), the CPU 110 extracts a shift angle corresponding to the local maximum point exceeding the threshold value of the second stage of the local maximum point that appears in the calculated change in the degree of coincidence (step S417). The CPU 110 then stores it in relation to the coordinate position of the currently set region of interest 410. Such coordinate position becomes the second candidate point, and the shift angle (rotation angle) becomes the second candidate angle.

The shift angle is not extracted if none of the local maximum points that appear in the calculated change in the degree of coincidence does not exceed the threshold value of the second stage.

If the maximum value in the calculated change in the degree of coincidence does not exceed the threshold value of the second stage (NO in step S416), the process of step S417 is skipped.

The CPU 110 thereafter determines of any of the plurality of set regions of interest 410 that is not yet evaluated exists (step S418). In other words, whether or not the region of interest 410, in which the calculation of the edge code histogram and the calculation of the change in the degree of coincidence are not performed, is left.

If the region of interest of the plurality of set regions of interest 410 that is not yet evaluated exists (YES in step S418), the CPU 110 calculates the edge code histogram on the partial image contained in the remaining region of interest 410 of the plurality of set regions of interest 410 (step S419). The processes after step S415 are then repeated.

If the region of interest of the plurality of set regions of interest 410 that is not yet evaluated does not exist (NO in step S418), the CPU 110 determines whether or not the candidate point where the plurality of regions of interest 410 are not yet set of the acquired candidate point group of the first stage exists (step S420). In other words, whether or not all, the rough search process of the second stage centering on the candidate point group of the first stage is completed is determined.

If the candidate point where the plurality of regions of interest 410 is not yet set of the acquired candidate point group of the first stage exists (YES in step S420), the CPU 110 sets the plurality of regions of interest 410 with another candidate point of the acquired candidate point group of the first stage as the center (step S421). The processes after step S414 are then repeated.

If the acquired candidate point group of the first stage does not exist (NO in step S420), the CPU 110 extracts a candidate point by the rough search process from the second candidate point extracted in a cluster in the input image by performing the clustering process on the second candidate point extracted in step S417 (step S422). The CPU 110 then outputs the candidate point extracted in step S422 and the corresponding second candidate angle (shift angle extracted in step S417) as the candidate point (coordinate position) and the candidate angle from the rough search process (step S423).

The process then proceeds to step S5 of FIG. 12.

The threshold value of the first stage used in step S406 and the threshold value of the second stage used in S416 can be arbitrarily determined according to the accuracy necessary in the search process of each stage. It should be recognized that the threshold value of the first stage and the threshold value of the second stage may be set to the same value. By way of example, a value, which is obtained by multiplying a value (candidate point level shown in FIG. 25) input by the user to the number of edge points extracted from the model, can be set as the threshold value of the first stage and the second stage.

<<J. Detailed Search Process>>

The detailed search process shown in step S5 of FIG. 6 is described.

In the detailed search process according to the embodiment, the region where the object that matches the model exists in the input image is searched by calculating the degree of coincidence (typically, correlation value) with the edge code image 42 registered as the model, as opposed to the rough search process.

In this case, the region of interest for calculating the correlation value with the edge code image representing the model is set in a range in which the candidate point and the candidate angle extracted in the rough search process are the center.

Figures 18A, 18B:
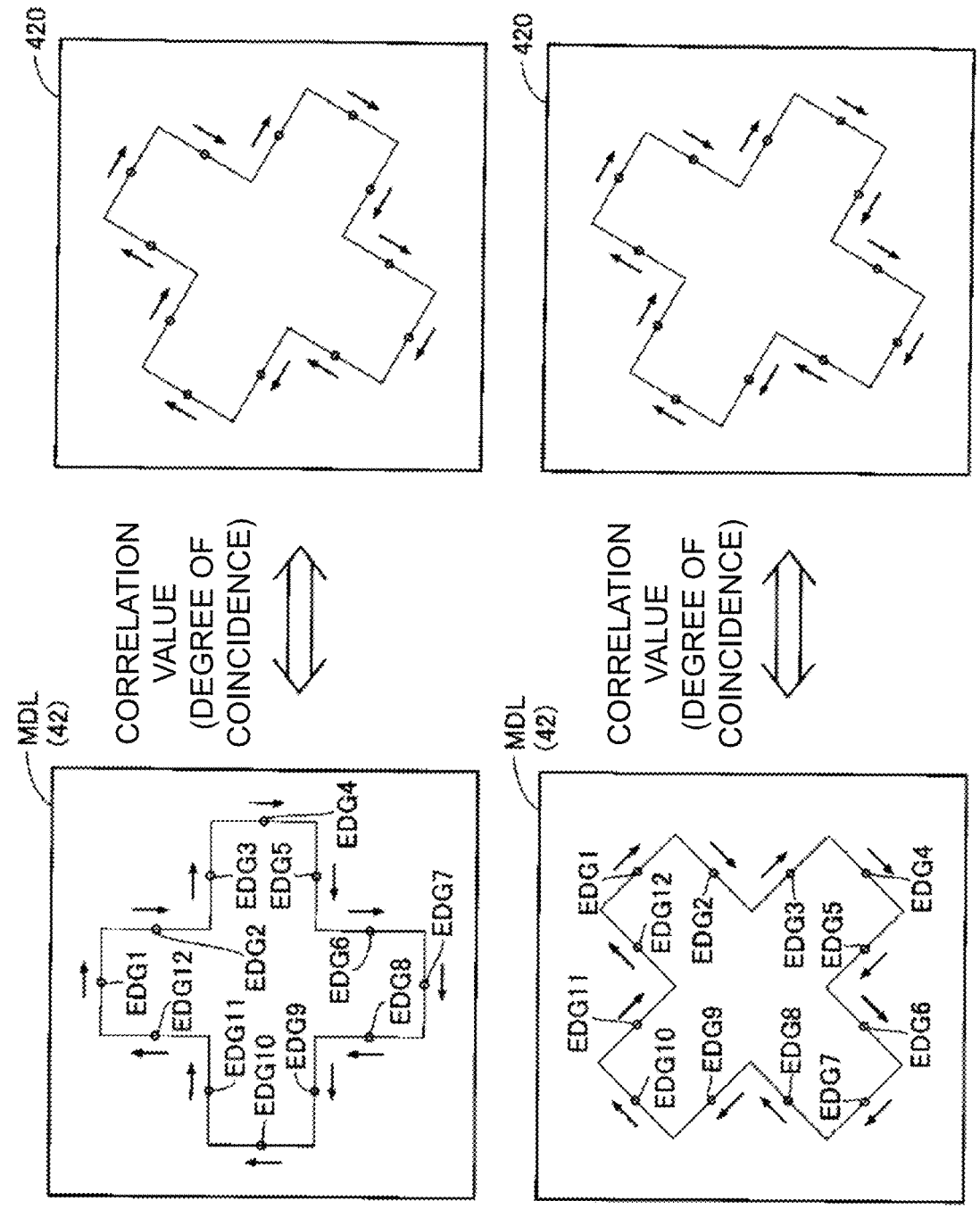
FIGS. 18A and 18B are views describing a detailed search process according to an embodiment.

FIGS. 18A and 18B are views describing the detailed search process according to the embodiment of the present invention. In particular, FIG. 18A shows one example of a state of the registered edge code image 42, and FIG. 18B shows one example of a state of the edge code image 42 being subjected to the detailed search process. As shown in FIG. 18A, in the detailed search process according to the embodiment, the degree of coincidence is calculated between the edge code image 42 representing the model and the edge code image on the partial image (object) contained in the region of interest 420 set in the input image IMG. The degree of coincidence is typically calculated as the correlation value. Specifically, the correlation value is calculated based on the position deviation and the angle deviation on the extracted corresponding edge between the edge code image 42 of the model and the edge code image of the region of interest 420. In other words, the correlation value is higher if the position of the extracted edge and the angle at the relevant edge are both approximate between the two edge code images.

In the pattern matching process according to the embodiment, the position (measurement coordinate) where the object that matches the model registered in advance exists and the tilt (candidate angle) of the object with the registered model as the reference are output. Thus, the correlation value is sequentially calculated by sequentially setting the region of interest 420 at different positions in the input image IMG and sequentially changing the rotation angle between the partial image contained in each region of interest 420 and the model.

In particular, in the detailed search process according to the embodiment, the region of interest 420 is set at the candidate point obtained by the rough search process or the periphery thereof. Furthermore, the edge code image of the model or the partial image contained in the set region of interest 420 is rotated by the candidate angle obtained by the rough search process or the vicinity value thereof. Therefore, the amount of calculation required for the search process can be reduced by changing the initial setting using the result of the rough search process.

In the detailed search according to the embodiment as well, the process is executed in two stages (detailed search (first stage) function 61 and detailed search (second stage) function 62 shown in FIG. 7). In the first stage of the detailed search process, the degree of coincidence (correlation value) with the model is sequentially evaluated by moving the region of interest 420 at an interval set in advance. In the second stage of the detailed search process, the peak position is specified by interpolating the change characteristics of the correlation value calculated when a plurality of regions of interest 420 is set at the periphery of the position indicating high correlation value, so that the position of the object that matches the model at an interval (high accuracy) smaller than the movement interval set in advance can be specified. Therefore, even if the search is carried out by moving the region of interest 420 in units of one pixel, the measurement coordinate can be calculated in units of sub-pixels, smaller than the pixel.

As hereinafter described, conditions (determination conditions) can be set on the range that can be output as the measurement coordinate and the measurement angle. In other words, the user can set conditions with respect to the results obtained through pattern matching so that a wrong search result is avoided. In this case, whether or not the extracted measurement coordinate and the measurement angle satisfy the determination condition is determined, and only those that satisfy the determination condition are output.

Reference is to be made on Japanese Unexamined Patent Publication No. 9-54828, Japanese Unexamined Patent Publication No. 2002-230549, and Japanese Unexamined Patent Publication No. 2002-230562 for the more detailed procedures (e.g., calculation method of correlation value, etc.) of the detailed search process according to the embodiment.

In other words, in the detailed search process according to the embodiment, the region of interest 420 is set to a plurality of neighborhood positions including the candidate point extracted by the rough search process, and a plurality of edge code images obtained when the edge code image indicating the model is rotated to a plurality of neighborhood angles including the candidate angle corresponding to each candidate point is prepared. The region that matches the model in the input image can be specified by calculating the degree of coincidence between each of the plurality of types of edge code images obtained by rotating the edge code image of the model and each of the edge code images on the plurality of regions of interest 420.

The processing procedure in the rough search process can be summarized as below.

Figure 19:
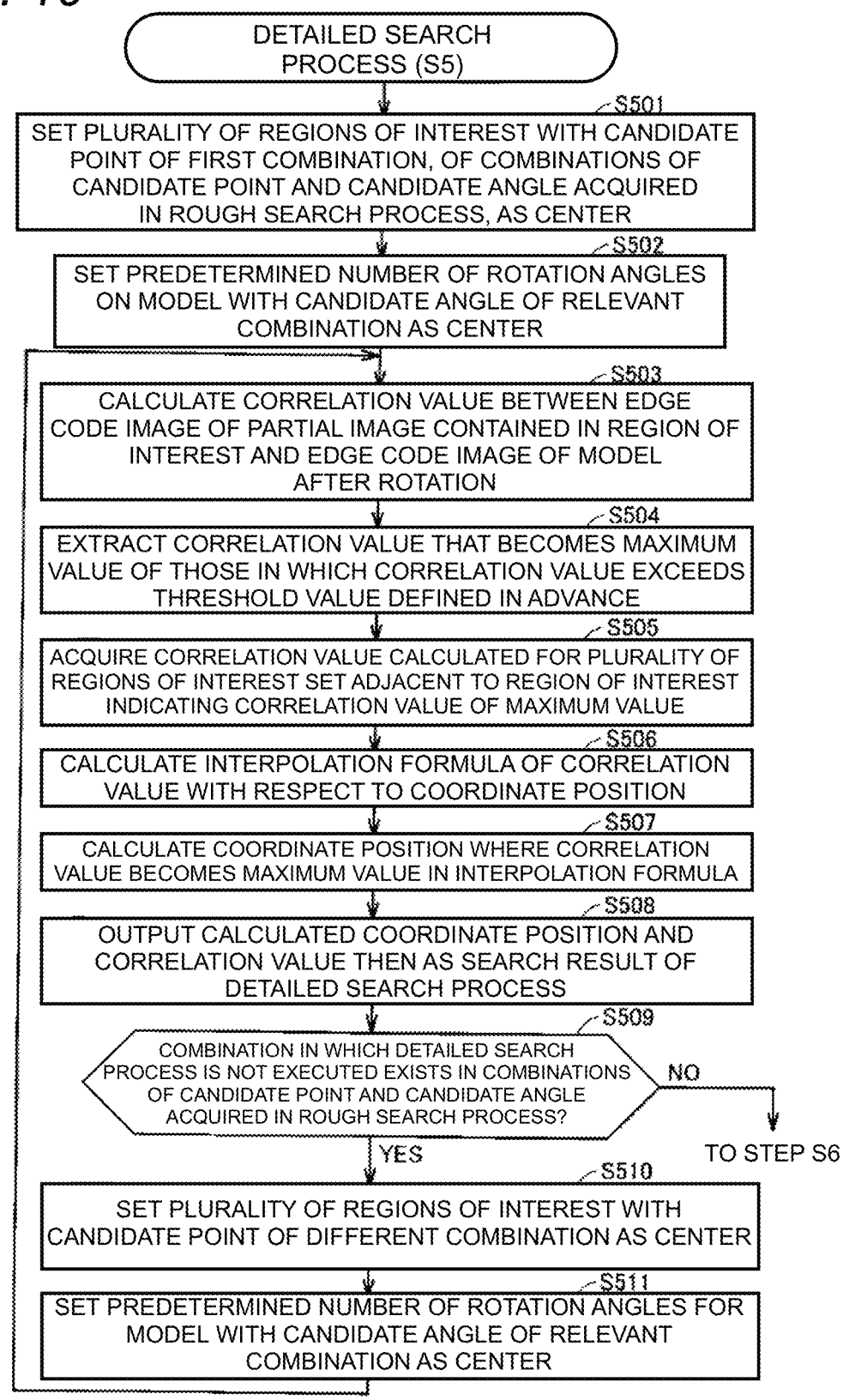
FIG. 19 is a flowchart showing a more detailed processing procedure in the detailed search process according to an embodiment.

FIG. 19 is a flowchart showing a more detailed processing procedure in the detailed search process according to the embodiment.

With reference to FIG. 19, the CPU 110 sets a plurality of regions of interest 420 with a candidate point of the first combination, of the combinations of the candidate point and the candidate angle acquired in the rough search process, as the center (step S501). More specifically, the CPU 110 sets a predetermined number of regions of interest 420 at the periphery of the center, the center being the coordinate position of the candidate point of the relevant combination. The CPU 110 sets a predetermined number of rotation angles for the model with the candidate angle of the relevant combination as the center (step S502). Thereafter, the CPU 110 calculates the correlation value between the edge code image of the partial image contained in the region of interest 420 set in step S501 and the edge code image of the model after being rotated by a rotation angle set in step S502 (step S503). In other words, the CPU 110 calculates the correlation value of the number corresponding to the product of the number of regions of interest 420 set in step S501 and the number of rotation angles set in step S502.

The CPU 110 then extracts a correlation value that becomes a maximum value of those exceeding the threshold value defined in advance of the plurality of calculated correlation values (step S504). In this case, the CPU 110 may extract only that in which the correlation value exceeds the threshold value defined in advance and that which satisfies the determination condition defined in advance.

The CPU 110 then acquires the correlation value calculated on the plurality of regions of interest 420 set adjacent to the region of interest 420 indicating the correlation value of maximum value (step S505). The CPU 110 calculates an interpolation formula on the correlation value with respect to the coordinate position from the relationship of the coordinate position of the region of interest 420 indicating the correlation value of maximum value and the region of interest 420 in the vicinity thereof, and the respectively corresponding correlation value (step S506). The CPU 110 further calculates the coordinate position where the correlation value becomes a maximums value in the interpolation formula calculated in step S506 (step S507). In other words, a function indicating the relationship of the coordinate position and the correlation value is calculated using the correlation value in each region of interest 420 discretely arranged at a preset interval, and the coordinate position where the correlation value becomes the highest is calculated from such calculated function.

The CPU 110 outputs the calculated coordinate position (measurement coordinate) and the correlation value at the time as the search result of the detailed search process (step S508). For the rotation angle, the rotation angle set to the region of interest 420 where the correlation value extracted in step S504 becomes a maximum value is output as the search result.

Subsequently, the CPU 110 determines whether or not the combination in which the detailed search process is not executed exists in the combinations of the candidate point and the candidate angle acquired in the rough search process (step S509). If the combination in which the detailed search process is not executed exists (YES in step S509), the CPU 110 sets a plurality of regions of interest 420 with a candidate point of a different combination, of the combinations of the candidate point and the candidate angle acquired in the rough search process, as the center (step S510), and sets a predetermined number of rotation angles on the model with the candidate angle of the relevant combination as the center (step S511). The processes after step S503 are then repeated.

If the combination in which the detailed search process is not executed does not exist (NO in step S509), that is, if the detailed search process is completed on all the combinations of the candidate point and the candidate angle acquired in the rough search process, the process proceeds to step S6 of FIG. 12.

<<K. Angle Search Process>>

The angle search process shown in step S6 of FIG. 6 is described.

In the detailed search (second stage), the interpolation formula showing the relationship of the coordinate position and the correlation value is calculated, and the coordinate position at which the correlation value becomes the highest is calculated using the calculated interpolation formula. Thus, even if the region of interest 420 is discretely set, the region that matches the model can be more specifically specified.

In the angle search process according to the embodiment, the processes similar to the processes on the coordinate position are performed on the rotation angle. However, the edge code histogram described above is used to specify the rotation angle.

Figure 20A:
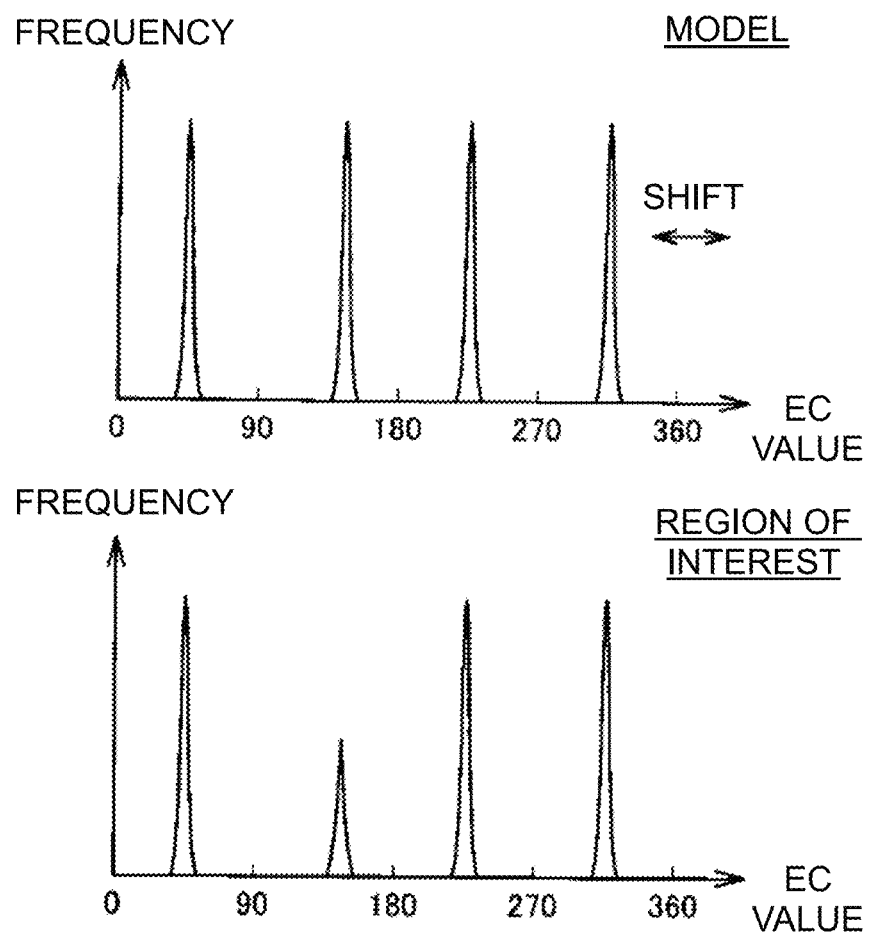
FIGS. 20A and 20B are views describing an angle search process according to an embodiment.
Figure 20B:
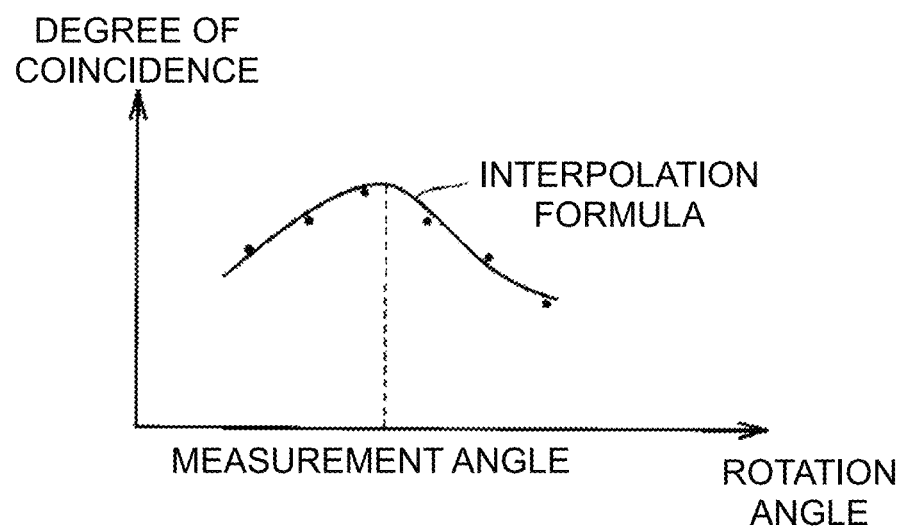

FIGS. 20A and 20B are views describing the angle search process according to the embodiment of the present invention. FIG. 20A shows one example of the edge code histograms on the model and the edge code histogram on the partial image contained in the region of interest, and FIG. 20B shows one example of the interpolation formula on the rotation angle.

FIG. 20A shows one example of the edge code histogram obtained when the model is rotated by the rotation angle obtained in the detailed search process executed first, and shows one example of the edge code histogram obtained when the region of interest 420 is set at the coordinate position (measurement coordinate) obtained in the relevant detailed search process.

In the angle search process according to the embodiment, the rotation angle at which the degree of coincidence between the two edge code histograms becomes the highest is calculated from the interpolation formula.

More specifically, the interpolation formula on the degree of coincidence with respect to the rotation angle is calculated from the relationship of the rotation angle indicating the maximum correlation value calculated in the angle search process and the rotation angle in the vicinity thereof, and the respectively corresponding degree of coincidence. In other words, as shown in FIG. 20B, the interpolation formula is calculated (parabolic interpolation) from the relationship of each rotation angle that is discretely set and the degree of coincidence (plot in FIG. 20B), and the rotation angle at which such calculated interpolation formula takes a maximum value (local maximum value) is output as the measurement angle. For instance, the measurement angle can be calculated at a precision smaller than 1° from the interpolation formula on the degree of coincidence obtained by rotating the model 1° at a time.

In other words, in the angle search process according to the embodiment, the rotation angle with respect to the model of the object existing in the region that matches the model specified in the detailed search process is calculated using the change in degree of coincidence between the edge code histograms obtained when the relative positional relationship between the edge code histogram of the model and the edge code histogram on the region (each measurement coordinate) that matches the model specified by the detailed search process is changed in plural ways.

The processing procedure in the angle search process described above is summarized below.

Figure 21:
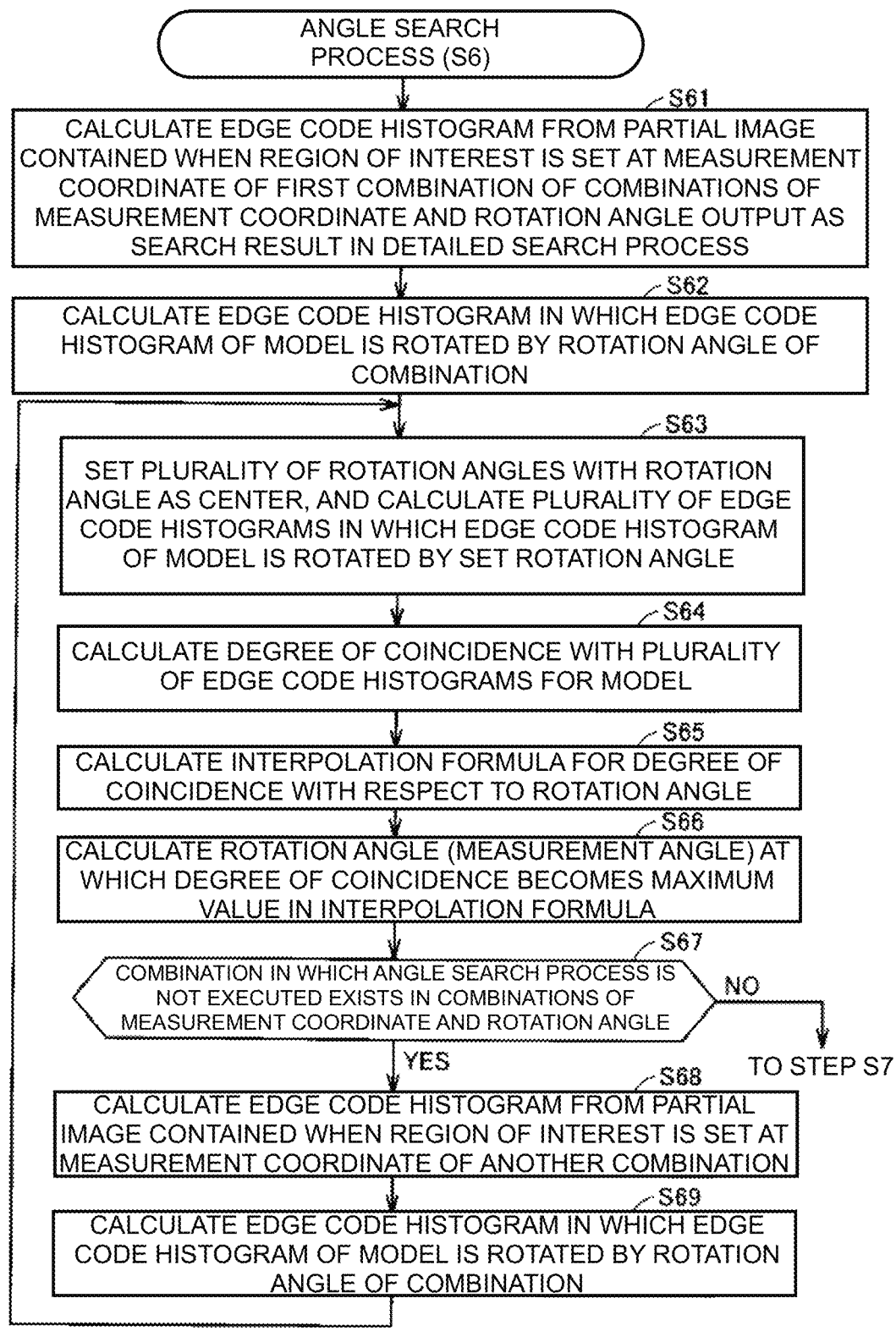
FIG. 21 is a flowchart showing a more detailed processing procedure in the angle search process according to an embodiment.

FIG. 21 is a flowchart showing the more detailed processing procedure in the angle search process according to the embodiment of the present invention.

With reference to FIG. 21, the CPU 110 calculates the edge code histogram from the partial image contained when the region of interest is set at the measurement coordinate of the first combination of the combinations of the measurement coordinate and the rotation angle output as the search result in the detailed search process (step S61).

The CPU 110 calculates the edge code histogram in which the edge code histogram of the model is rotated by the rotation angle of the relevant combination (step S62). The CPU 110 also sets a plurality of rotation angles with the rotation angle used in step S62 as the center and calculates a plurality of edge code histograms in which the edge code histogram of the model is rotated by the set rotation angle (step S63).

The degree of coincidence between the edge code histogram on the region of interest calculated in step S61 and the plurality of edge code histograms on the model calculated in steps S62 and S63 is calculated (step S64). The CPU 110 then calculates an interpolation formula on the degree of coincidence with respect to the rotation angle from the relationship of the respective rotation angle and the magnitude of the corresponding degree of coincidence (step S65). Furthermore, the CPU 110 calculates the rotation angle (measurement angle) at which the degree of coincidence becomes a maximum value in the interpolation formula calculated in step S65 (step S66). In other words, a function showing the relationship of the rotation angle and the degree of coincidence is calculated using the degree of coincidence calculated on the rotation angle discretely arranged at a preset interval, and the rotation angle at which the degree of coincidence becomes the highest is determined as the measurement coordinate from the calculated function.

Thereafter, the CPU 110 determines if a combination in which the angle search process is not executed exists of the combinations of the measurement coordinate and the rotation angle output as the search result in the detailed search process (step S67).

If the combination in which the angle search process is not executed exists (YES in step S67), the CPU 110 calculates the edge code histogram (step S68) from the partial image contained when the region of interest is set to the measurement coordinate of a different combination of the combinations of the measurement coordinate and the rotation angle output as the search result in the detailed search process, and calculates the edge code histogram in which the edge code histogram of the model is rotated by the rotation angle of the relevant combination (step S69). The processes after step S63 are then repeated.

If the combination in which the angle search process is not executed does not exist (NO in step S67), the process proceeds to step S7 of FIG. 12.

<<L. Proximal Point Removing Process>>

The proximal point removing process shown in step S7 of FIG. 6 is described.

Some of the search results extracted by the series of search processes described above may arise from the same object. Thus, in the proximal point removing process according to the embodiment, the measurement results (measurement coordinate and measurement angle) redundantly extracted from the same object are removed.

Figure 22A:
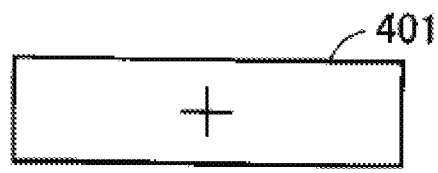
FIGS. 22A and 22B are views describing a proximal point removing process according to an embodiment.
Figure 22B:
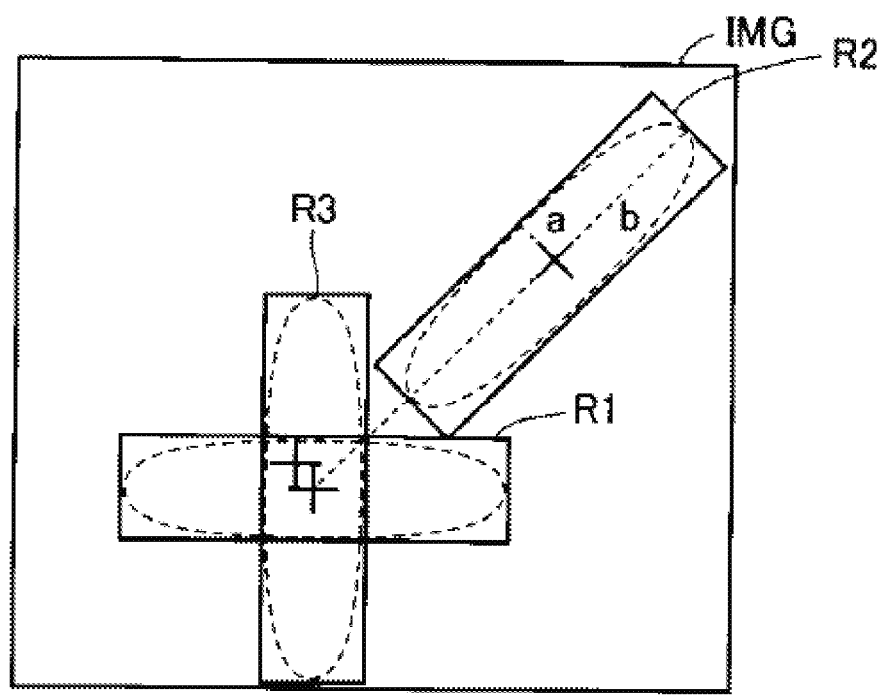

FIGS. 22A and 22B are views describing the proximal point removing process according to the embodiment of the present invention. In particular, FIG. 22A shows one example of a range 401 of the model specified by the user, and FIG. 22B shows one example of the result of performing the pattern matching process on the input image IMG.

As shown in FIG. 22A, when an image including a cross-mark is registered as a model, high correlation value appears even when the model is rotated by 90°, and thus two search results R1 and R3 may be calculated from the same object, as shown in FIG. 22B. In FIG. 22B, the search result R2 is the match with respect to another object.

In such a case, the search result R2 is handled as an effective search result, and either one of the search results R1 and R3 is to be removed. In the proximal point removing process according to the embodiment, the proximal degree between the respective regions (search results R1, R2, R3 shown in FIG. 22B) extracted based on the search result obtained from the series of search processes (rough search process, detailed search process, angle search process) is evaluated, and that of lower correlation value is removed if proximate regions exist.

More specifically, an inscribed ellipse in the region is set with respect to each extracted region as shown in FIG. 22B, and if the distance between the center positions of the ellipses set for the two regions is proximate, the two regions are determined as proximal points. The region of smaller correlation value of the two regions determined as proximate is then removed.

More specifically, those which intersect each other of the set ellipses are determined as proximate. Therefore, the ellipse is set in each region to easily determine whether or not they intersect each other. In other words, if the radius of the minor axis of the ellipse is a and the radius of the major axis of the ellipse is b as shown in FIG. 22B, the two ellipses do not intersect if the distance between the center points of the two ellipses is greater than $(a+b)/2$, and the two ellipses intersect if the distance between the center points of the two ellipses is smaller than or equal to $(a+b)/2$. Thus, in the proximal point removing process according to the embodiment, the ellipse is set for every extracted region and the inter-center distance between two arbitrary ellipses is sequentially evaluated with the average value of the minor axis radius and the major axis radius of the set ellipse as the threshold value.

The search result redundantly extracted with respect to the same object in the input image is removed in such manner.

The processing procedure in the angle search process is summarized below.

Figure 23:
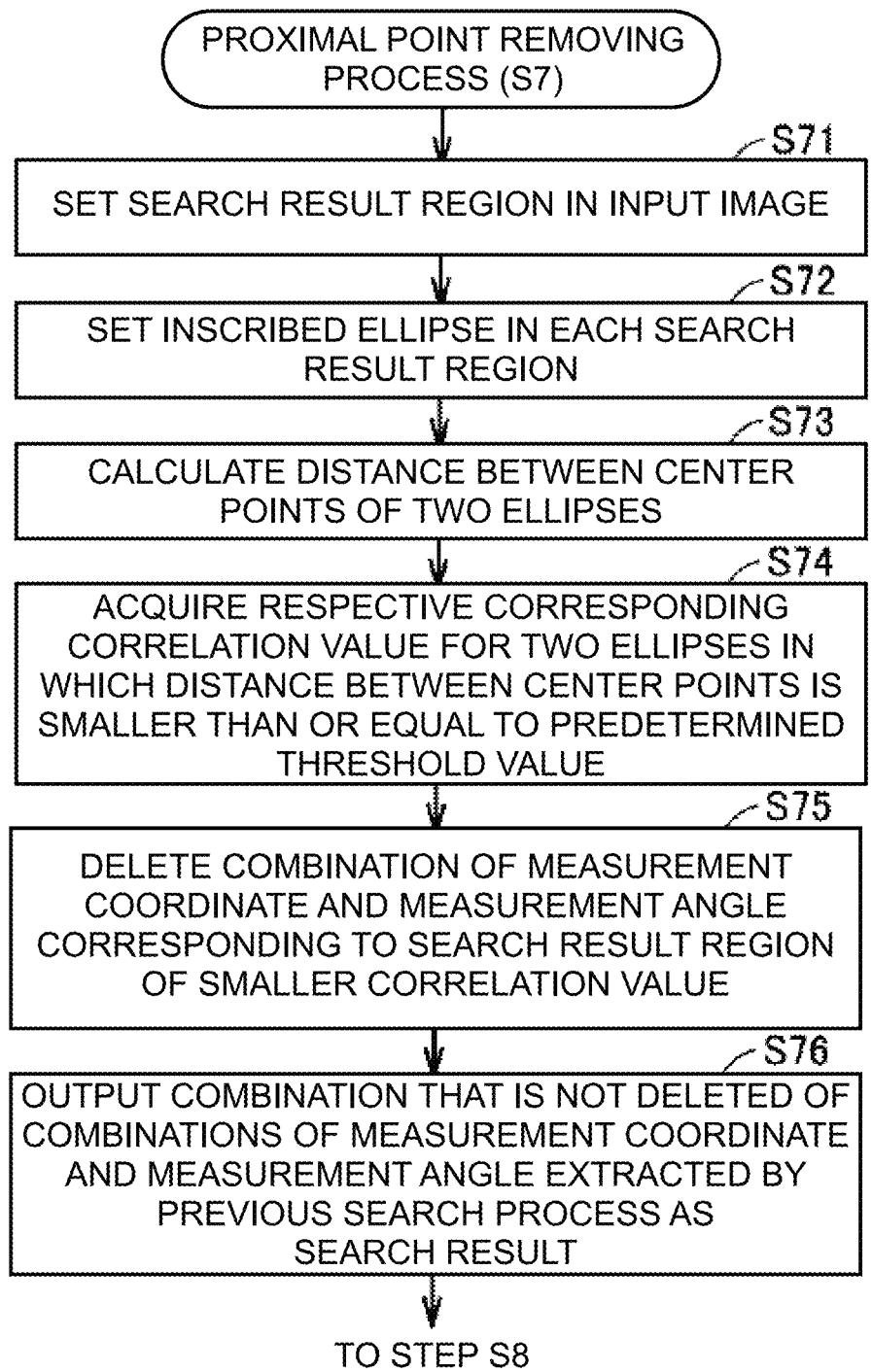
FIG. 23 is a flowchart showing a more detailed processing procedure in the proximal point removing process according so an embodiment.

FIG. 23 is a flowchart showing the more detailed processing procedure in the proximal point removing process according to the embodiment of the present invention.

With reference to FIG. 23, the CPU 110 sets the search result region in the input image based on each combination of the measurement coordinate and the measurement angle extracted by the previous search process (step S71). The CPU 110 then sets an inscribed ellipse in each search result region set in step S71 (step S72).

The CPU 110 then calculates the distance between the center points of the two ellipses set in step S72 (step S73). The CPU 110 acquires the respective corresponding correlation value for the two ellipses in which the distance between the center points is smaller than or equal to a predetermined threshold value (step S74). The threshold value is set to an average value of the minor axis radius and the major axis radius of the set ellipse.

The CPU 110 then deletes the combination of the measurement coordinate and the measurement angle corresponding to the search result region in which the acquired correlation value is smaller (step S75).

Finally, the CPU 110 outputs the combination not deleted in step S75 of the combinations of the measurement coordinate and the measurement angle extracted by the previous search process as the search result (step S76). The process thereafter proceeds to step S8 of FIG. 12.

<<M. User Setting>>

One example of an input method from the user of various set values necessary for the pattern matching process of the embodiment is described.

Figure 24:
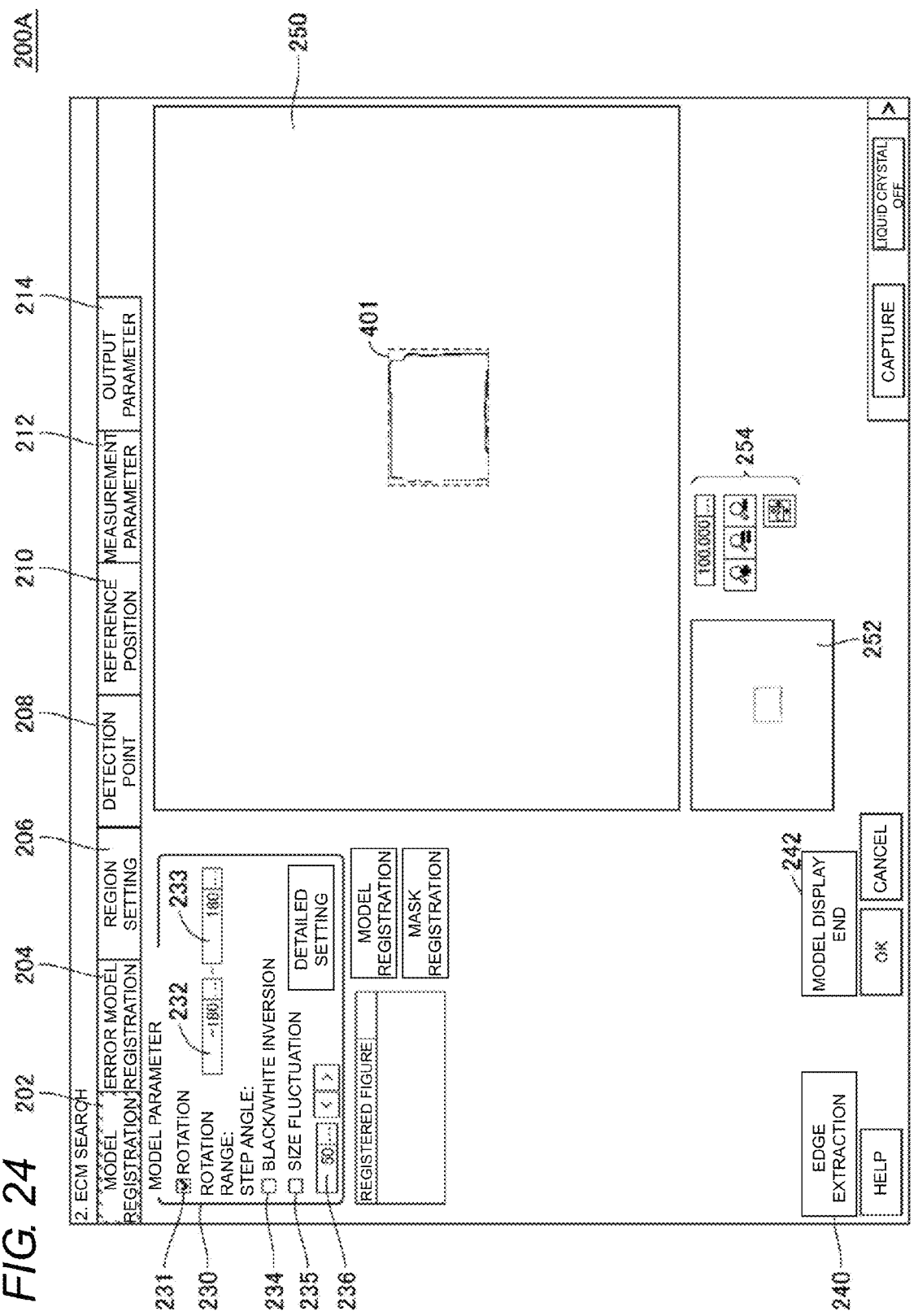
Figure 25:
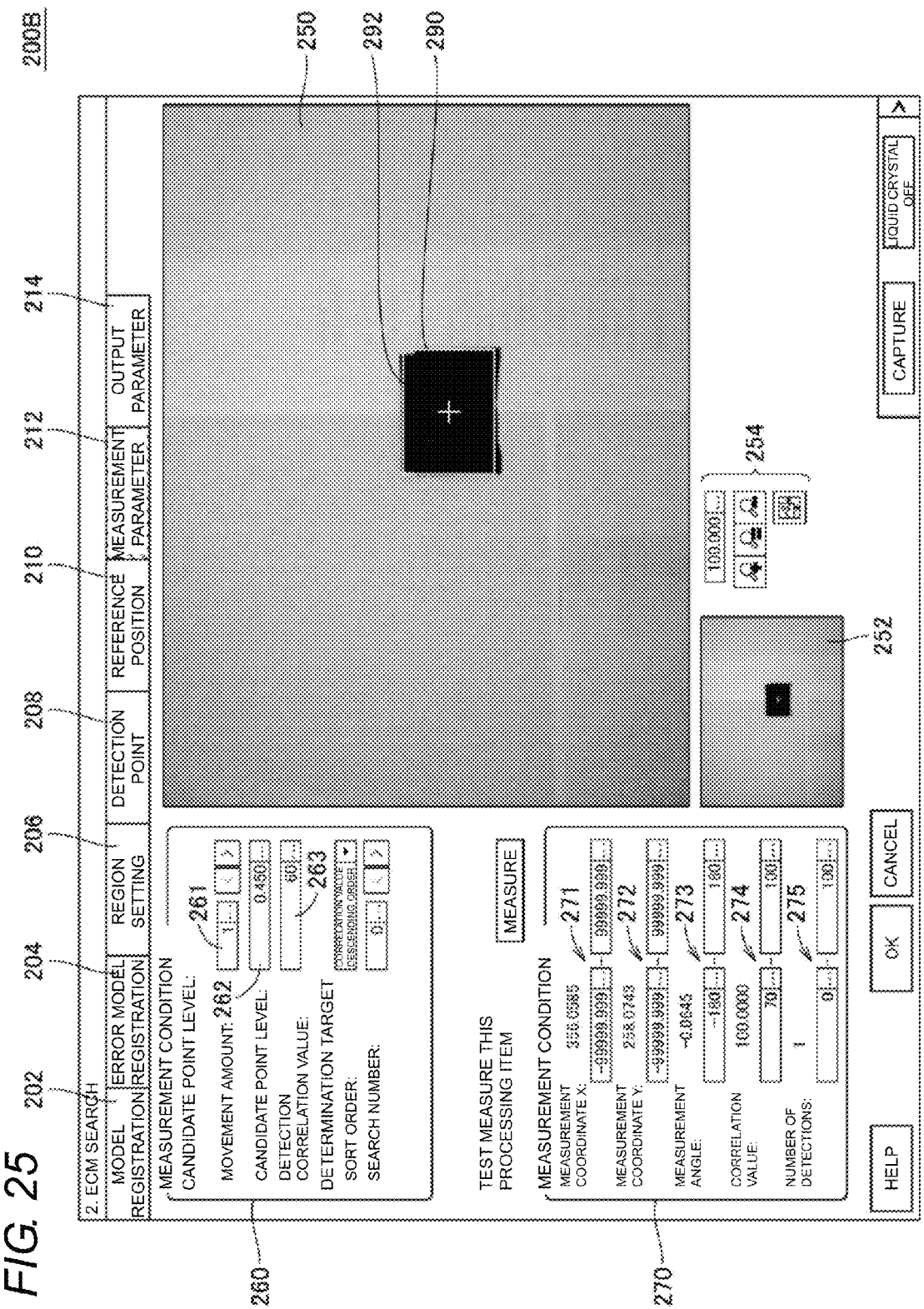
FIG. 25 is a view showing one example of a user interface screen provided in the setting mode by the image processing device according to an embodiment.

FIG. 24 and FIG. 25 are views showing one example of a user interface screen provided in the setting mode by the image processing device 100 according to the embodiment. In particular, FIG. 24 shows a user interface screen 200A when the user specifies a range to register as a model, and FIG. 25 shows a user interface screen 200B when the user sets various set values (measurement conditions) necessary for the pattern matching process.

In the user interface screen 200A shown in FIG. 25, a model registration tab 202, an error model registration tab 204, a region setting tab 206, a detection point tab 208, a reference position tab 210, a measurement parameter tab 212, and an output parameter tab 214 are selectably displayed. In the user interface screen 200A shown in FIG. 25, a state in which the model registration tab 202 is selected is shown. In other words, the user interface screen 200A is a user interface for receiving set values and the like necessary for the model registration process described above.

The user interface screen 200A includes a model parameter setting area 230, an image display area 250, an entire display area 352, and a display control icon group 354.

An input image (model image) generated by imaging the work model to become the reference with the imaging device 8 is displayed in the image display area 250. The user can set the range 401 to register as a model, with respect to the image display area 250 by performing mouse operation and the like. The CPU 110 acquires the coordinate information of the range 401 set in the image display area 250, and executes the model registration process.

When the user selects the edge extract button 240, the edge extraction process is executed on the acquired input image, and the extracted edge point is displayed in the image display area 250. FIG. 24 shows an example in which the position (edge image) of the extracted edge point is shown. The input image itself that is acquired by the imaging device 8 through imaging may be displayed in the image display area 250 in place of the edge image.

When the user selects one of the buttons of the display control icon group 254, the display range/display magnification and the like of the image to display in the image display area 250 are changed according to the selected button. The entire image that can be displayed in the image display area 250 is displayed in the entire display area 252.

In the model parameter setting area 230, the parameter for searching while rotating the model to register is received. More specifically, when the rotation check box 231 is made effective, the detailed search process, the angle search process, and the like are made effective. In other words, when the rotation check box 231 is made invalid, the pattern matching process with the model rotating is not performed.

When the rotation check box 231 is made effective, the model is rotated within the numerical range (rotation range) set in the numerical value input boxes 232 and 233 by the user, so that the detailed search process is executed. The angle interval (step angle) for rotating the model is set in the numerical value input box 236. The processing speed can be enhanced while maintaining the search accuracy by appropriately setting the rotation range and/or step angle according to the target work.

In the black/white inversion check box 234, the valid/invalid of the black/white inversion (negative positive inversion) process of the model can be set. This parameter is effective when the background is too bright or too dark. Furthermore, in the size fluctuation neck box 235, the valid/invalid of the pattern matching process in which the model is enlarged/reduced can be set. In other words, when the size fluctuation check box 235 is made effective, an additional model obtained by enlarging or reducing the registered model is used in the pattern matching process in addition to the model registered in advance.

When the user selects the model display end button 242, the user interface screen 200A is closed, and the screen transitions to the menu screen etc. (not shown).

When the measurement parameter tab 212 is selected, the user interface screen 200B (FIG. 25) for setting the measurement conditions necessary for the pattern matching process or one example of the measurement process is displayed.

The user interface screen 200B shown in FIG. 25 includes measurement condition setting areas 260 and 270.

In the measurement condition setting area 260, the parameter (candidate point level) necessary mainly for the rough search process described above is received. In other words, the numerical value (number of pixels) input no the numerical value input box 261 of the movement amount means the interval to set the region of interest 410 with respect to the input image. In the first stage of the rough search process, the movement amount of the region of interest 410 is set to the integral multiplies (e.g., two times) of the number input to the numerical value input box 261.

The number input to the numerical value input box 262 of the candidate point level is used for the setting of the threshold value with respect to the difference histogram between the edge code histograms. The number input to the numerical value input box 263 of the correlation value is used as the condition to be extracted as the candidate point in the rough search process.

In the measurement condition setting area 270, the determination condition for setting the valid measurement result of the measurement results obtained through the pattern matching process according to the embodiment is received.

In other words, the numerical range (coordinate range) input to the numerical value input box 271 of the measurement coordinate X is used as the determination condition on the x component of the measurement coordinate. The numerical range (coordinate range) input to the numerical value input box 272 of the measurement coordinate Y is used as the determination condition on the y component of the measurement coordinate. The numerical range (angle range) input to the numerical value input box 273 of the measurement angle is used as the determination condition on the angle component of the measurement result.

Furthermore, the numerical range input to the numerical value input box 274 of the correlation value is used as the determination condition of the correlation value at each measurement coordinate. The numerical range input to the numerical value input box 275 of the number of detections is used as the condition of the maximum number of detections output by the execution of one pattern matching process.

In the user interface screen 200B shown in FIG. 25, the input image imaged with the imaging device 8 is displayed in the image display area 250, and the measurement result extracted based on the set conditions is also displayed. In other words, a mark 290 indicating the position of the measurement coordinate extracted with respect to the object in the input image, and a frame 292 indicating the model region having the mark 290 as the center are displayed in an overlapping manner.

<<N. Output Process>>

Lastly, the output process shown in step S8 of FIG. 6 is described.

Figure 26:
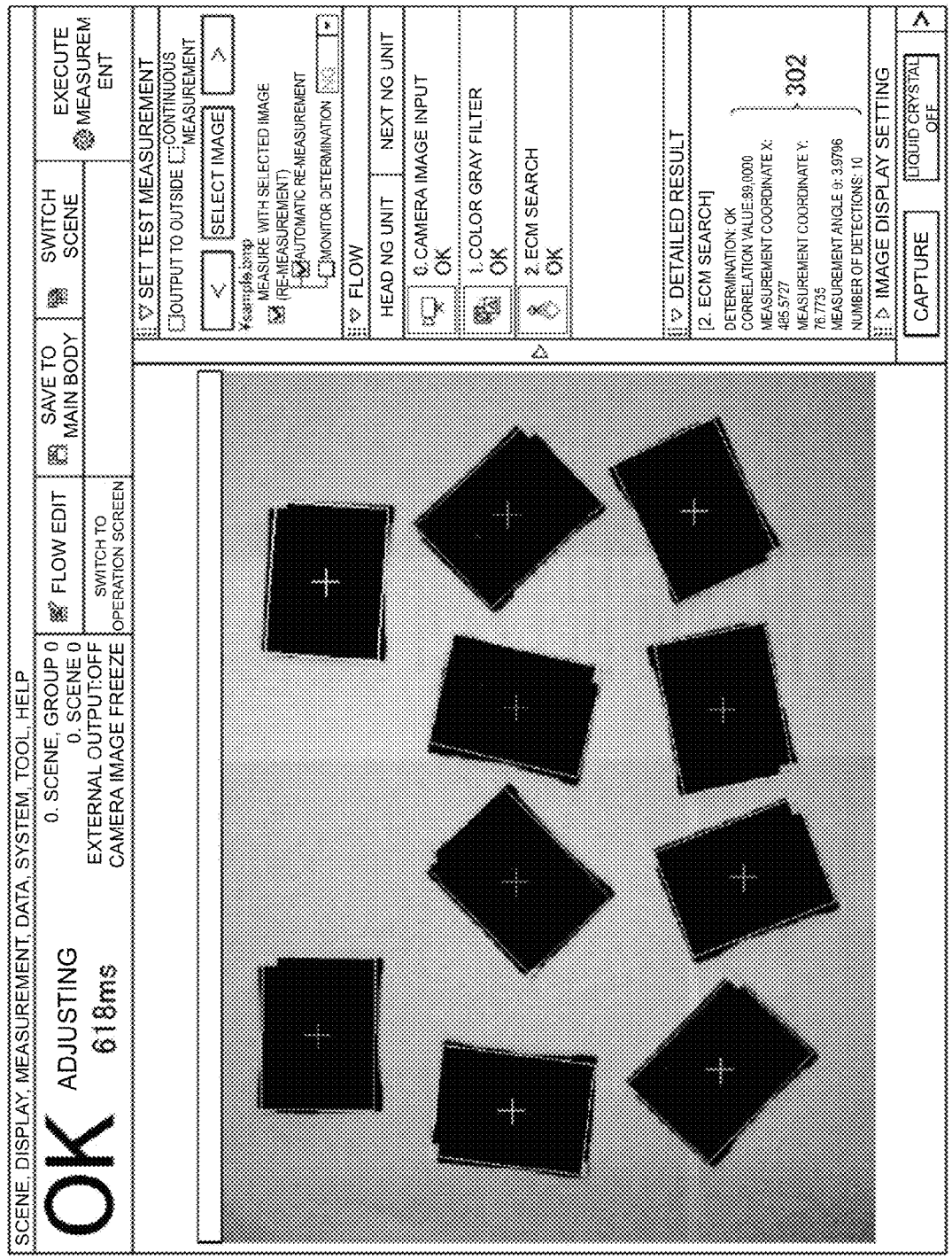
FIG. 26 is a view showing one example of a user interface screen provided in the measuring mode by the image processing device according to an embodiment.

FIG. 26 is a view showing one example of a user interface screen provided in the measurement mode by the image processing device 100 according to the embodiment.

With reference to FIG. 26, in the user interface screen 300B, the measurement results obtained by performing the above-described pattern matching process with respect to the image data generated when a plurality of works exists in the field of the imaging device 8 are shown.

In other words, when the pattern matching process based on the model registered in advance is performed on the input image generated through imaging by the imaging device 8, the display visually showing the measurement result thereof is displayed in an overlapping manner on the input image and the numerical value showing the measurement value is also displayed (reference number 302).

<<O. Effects>>

According to the image processing device of the embodiment, the region that matches the model registered in advance is searched with respect to the input image through two methods of the rough search process and the detailed search process. The edge code histogram indicating the model is used in the rough search process, and the edge code image indicating the model is used in the detailed search process.

Thus, higher speed and higher accuracy of the pattern matching process can be realized by combining two types of search methods.

The embodiments disclosed herein are illustrative in all aspects and should not be construe as being restrictive. The scope of the invention is defined by the Claims and not by the description made above, and the meanings equivalent to the Claims and all modifications made within the scope are intended to be encompassed herein.

What is claimed is:

1. An image processing method for searching a region that matches a model registered in advance from an input image, the image processing method comprising:
   a step of registering an edge code histogram generated from a plurality of edge codes contained in a model image;
   a step of setting a first region of interest with respect to the input image;
   a step of generating an edge code histogram for the first region of interest;
   a step of sequentially changing a relative positional relationship between the edge code histogram of the model and the edge code histogram for the first region of interest and sequentially calculating a degree of coincidence between the edge code histograms at each relative position;
   a step of evaluating a possibility that the region that matches the model is contained in the set first region of interest from the sequentially calculated degree of coincidence between the edge code histograms; and
   a first specifying step of sequentially changing the center position of the first region of interest with respect to the input image and repeating the generating step, the calculating step, and the evaluating step for each first region of interest to specify a candidate point having a possibility of matching the model in the input image.

2. The image processing method according to claim 1, wherein the first specifying step includes,
   a step of temporarily determining the candidate point in units of a first interval by sequentially arranging the first region of interest at the first interval with respect to the input image, and
   a step of determining the candidate point in units of a second interval by sequentially arranging the first region of interest at the second interval shorter than the first interval at a plurality of nearby positions including the temporarily determined candidate point with respect to the input image.

3. The image processing method according to claim 2, wherein the first specifying step further includes a step of determining a rotation angle corresponding to the relative positional relationship of the edge code histogram and the edge code histogram for the first region of interest at which the degree of coincidence between the edge code histograms takes a local maximum value at the determined candidate point as a candidate angle corresponding to the candidate point.

4. The image processing method according to claim 3, wherein
   the registering step includes a step of storing an edge code image; and the image processing method further comprises the steps of:
   a step of setting a second region of interest at a plurality of nearby positions including the candidate point with respect to the input image; and
   a second specifying step of specifying a region that matches the model in the input image by calculating the degree of coincidence between each edge code image obtained when the edge code image showing the model is rotated to the plurality of nearby angles including the candidate angle corresponding to the candidate point and each edge code image for the second region of interest arranged at each of the plurality of positions.

5. The image processing method according to claim 4, further comprising a step of calculating a rotation angle with respect to the model of an object existing in the region that matches the model specified in the second specifying step using a change in the degree of coincidence between the edge code histograms obtained when the relative positional relationship between the edge code histogram of the model and the edge code histogram for the region that matches the model specified in the second specifying step is changed in plural ways.

6. The image processing method according to claim 5, further comprising a step of removing one of the regions proximate to each other of the regions that match the model specified in the second specifying step.

7. The image processing method according to claim 1, wherein the degree of coincidence between the edge code histograms is calculated from a cumulative value of frequency in a difference histogram of the two target edge code histograms.

8. The image processing method according to claim 1, wherein the generating step includes,
- a step of dividing the input image to blocks of a block size defined in advance and generating an edge code histogram for each block, the first region of interest being set to integral multiples of the block size; and
- a step of adding the edge code histogram for one or a plurality of blocks existing in the set first region of interest for every setting of the first region of interest with respect to the input image to generate the edge code histogram for the first region of interest.

9. The image processing method according to claim 1, wherein the registering step includes:
- a step of receiving a specification of a region to become the model with respect to the model image;
- a step of shaping the specified region to become the model to a square; and
- a step of generating the edge code histogram of the model from the edge code contained in a circular range inscribing the shaped region.

10. An image processing device for receiving an input image and searching a region that matches a model registered in advance, the image processing device comprising:
- a storage unit for storing an edge code histogram generated from a plurality of edge codes contained in a model image; and
- a specifying unit for specifying a candidate point having a possibility of matching the model in the input image by sequentially setting a first region of interest with respect to the input image; wherein the specifying unit,
- generates an edge code histogram for each set first region of interest,
- sequentially changes a relative positional relationship between the edge code histogram of the model and the edge code histogram for the first region of interest, and sequentially calculates a degree of coincidence between the edge code histograms at each relative position, and
- evaluates a possibility that the region that matches the model is contained in the set first region of interest from the sequentially calculated degree of coincidence between the edge code histograms.

* * * * *